United States Patent
Kamiya et al.

(10) Patent No.: US 11,880,153 B2
(45) Date of Patent: Jan. 23, 2024

(54) IMAGE FORMING DEVICE

(71) Applicant: Konica Minolta, Inc., Tokyo (JP)

(72) Inventors: Masahiro Kamiya, Toyohashi (JP);
Toshikazu Higashi, Toyokawa (JP);
Yasuhiro Ishihara, Toyohashi (JP);
Shigetaka Kato, Shinshiro (JP);
Katsuhide Sakai, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/685,035

(22) Filed: Mar. 2, 2022

(65) Prior Publication Data

US 2022/0283532 A1     Sep. 8, 2022

(30) Foreign Application Priority Data

Mar. 4, 2021 (JP) ................................. 2021-034192

(51) Int. Cl.
*G03G 15/00* (2006.01)
*H04N 1/00* (2006.01)

(52) U.S. Cl.
CPC ..... *G03G 15/5016* (2013.01); *H04N 1/00384* (2013.01); *H04N 1/00411* (2013.01)

(58) Field of Classification Search
CPC .......... G03G 15/5016; H04N 1/00384; H04N 1/00411; H04N 1/2392; H04N 1/2353; H04N 1/2323
See application file for complete search history.

(56) References Cited

U.S. PATENT DOCUMENTS

| | | | |
|---|---|---|---|
| 2011/0229168 A1 | 9/2011 | Shiraishi et al. | |
| 2014/0063517 A1* | 3/2014 | Tachibana | G03G 15/6508 358/1.12 |
| 2014/0175729 A1* | 6/2014 | Tanonaka | B31F 5/001 270/58.09 |
| 2018/0364954 A1* | 12/2018 | Tsuji | G06F 3/1204 |
| 2020/0195811 A1 | 6/2020 | Otake | |
| 2020/0379688 A1 | 12/2020 | Sugiura et al. | |
| 2022/0394146 A1* | 12/2022 | Kitagawa | G01N 21/47 |

FOREIGN PATENT DOCUMENTS

| | | |
|---|---|---|
| JP | 2007-062963 A | 3/2007 |
| JP | 2010217742 A | 9/2010 |
| JP | 2011191579 A | 9/2011 |
| JP | 2019111753 A | 7/2019 |
| JP | 2020098956 A | 6/2020 |
| JP | 2020192716 A | 12/2020 |
| JP | 2021033214 A | 3/2021 |

OTHER PUBLICATIONS

Office Action issued in corresponding Japanese Patent Application No. 2021034192, dated Dec. 13, 2022, with translation (15 pages).

* cited by examiner

*Primary Examiner* — Iriana Cruz

(74) *Attorney, Agent, or Firm* — Osha Bergman Watanabe & Burton LLP

(57) ABSTRACT

An image forming device includes: a sheet feeder that feeds a sheet; a controller that: discriminates a sheet type of the sheet, and receives a user input to specify a sheet type; and an image forming device that has two setting modes including an automatic discrimination mode in which an image is formed based on the discriminated sheet type and a user specified mode in which an image is formed based on the sheet type specified by the user input. The controller automatically switches one of the two setting modes to the other based on a defined condition.

25 Claims, 20 Drawing Sheets

FIG. 2A Position of media detection sensor 120
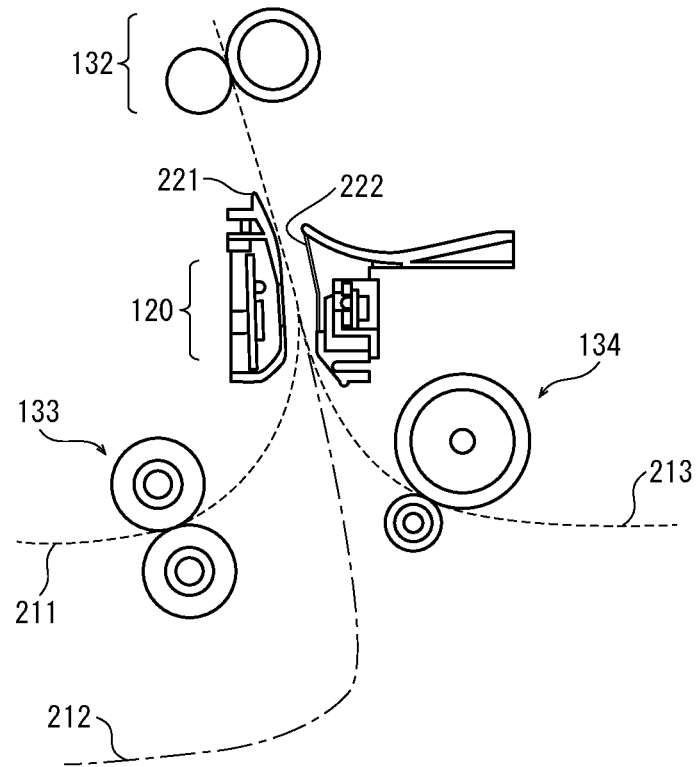
FIG. 2B Structure of media detection sensor 120
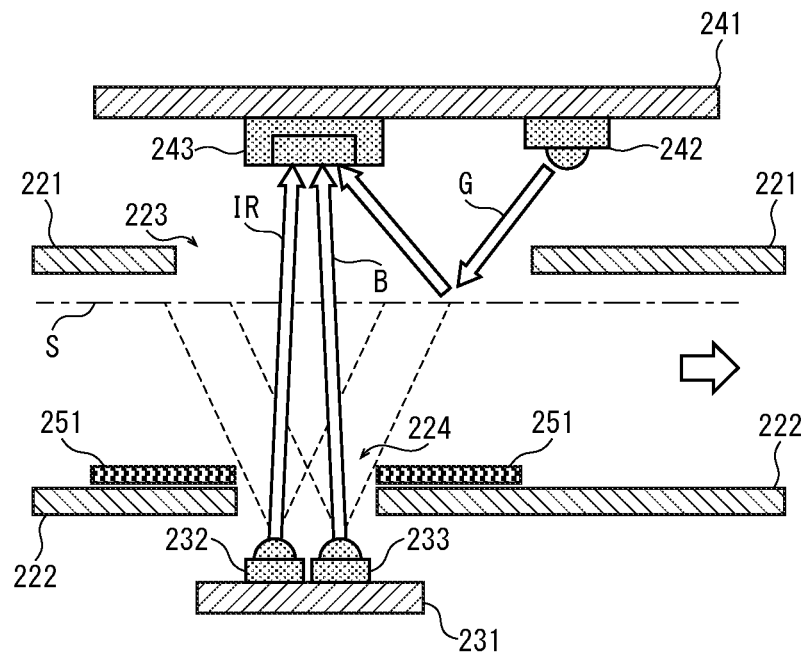

FIG. 3

Sheet basis weight table (g/m²)

| Sheet type | User specification | | Threshold adjustment (metric destination) | | Threshold adjustment (inches destination) | | Threshold adjustment (Europe destination) | |
|---|---|---|---|---|---|---|---|---|
| | Lower limit | Upper limit | Lower limit | Upper limit | Lower limit | Upper limit | Lower limit | Upper limit |
| Thin paper | 52 | 59 | 40 | 58.7 | 40 | 58.7 | 40 | 58.7 |
| ECO | | | | | | | | |
| Plain paper | 60 | 90 | 58.8 | 90.9 | 58.8 | 98.3 | 58.8 | 96.2 |
| Plain paper + | 91 | 105 | 91 | 109.9 | 98.4 | 110.6 | 96.3 | 109.9 |
| Thick paper 1 | 106 | 120 | 110 | 123.9 | 110.7 | 139.9 | 110 | 123.9 |
| Thick paper 1+ | 121 | 157 | 124 | 146.9 | 140 | 146.9 | 124 | 146.9 |
| Thick paper 2 | 158 | 209 | 147 | 209.9 | 147 | 209.9 | 147 | 209.9 |
| Thick paper 3 | 210 | 256 | 210 | 259.9 | 210 | 240.9 | 210 | 259.9 |
| Thick paper 4 | 257 | 300 | 260 | — | 241 | — | 260 | — |

FIG. 6A Sheet type settings screen (user specified)
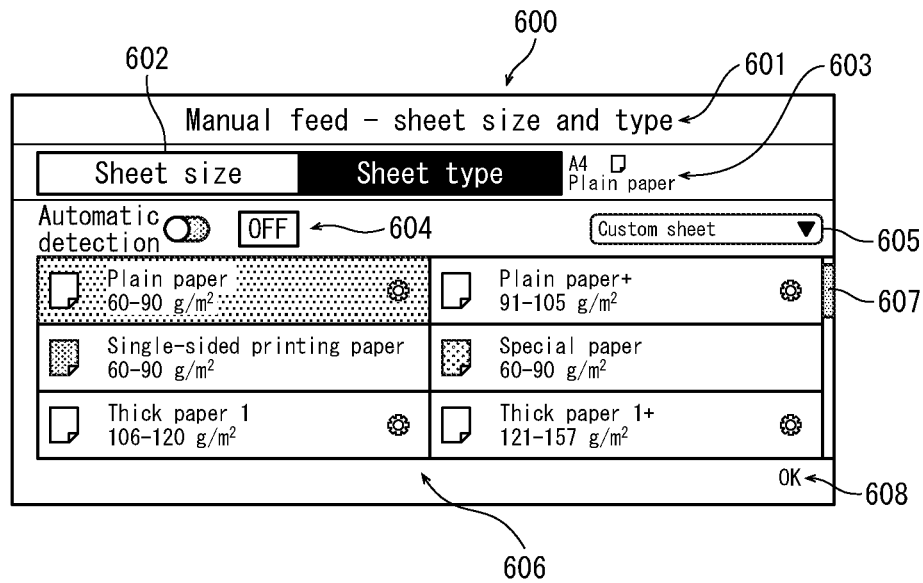
FIG. 6B Sheet type settings screen (automatic discrimination)
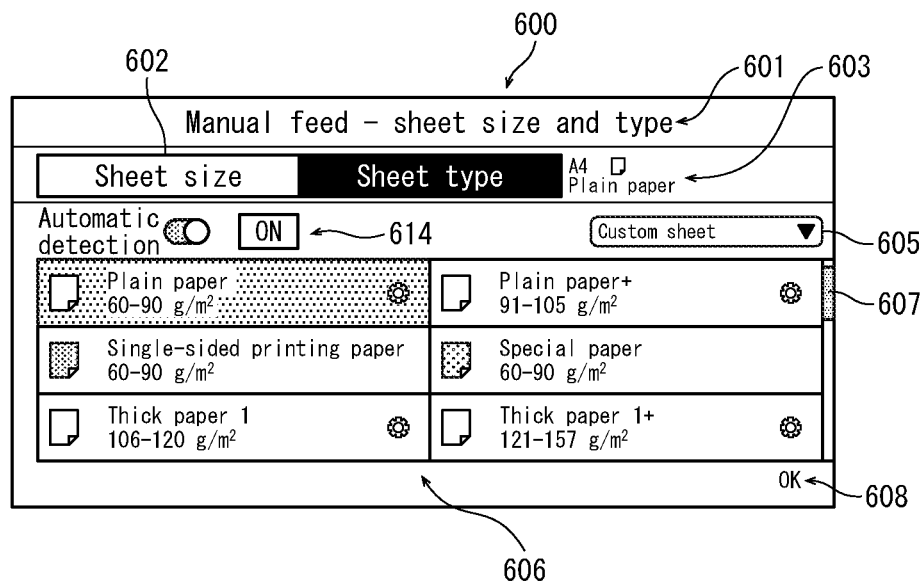

FIG. 7A Secondary transfer voltage settings
(normal temperature and humidity environment)

| Sheet type | | Secondary transfer voltage (V) | Category |
|---|---|---|---|
| Thin paper | (52-29g/m$^2$) | 1450 | Category 1 |
| Plain paper | (60-90g/m$^2$) | 1650 | Category 2 |
| Plain paper + | (91-105g/m$^2$) | 1850 | Category 3 |
| Thick paper 1 | (106-120g/m$^2$) | 1550 | Category 4 |
| Thick paper 1+ | (121-157g/m$^2$) | | |
| Thick paper 2 | (158-209g/m$^2$) | 1950 | Category 5 |
| Thick paper 3 | (210-256g/m$^2$) | | |
| Thick paper 4 | (257-300g/m$^2$) | | |

FIG. 7B Fixing temperature settings
(normal temperature and humidity environment)

| Sheet type | | Fixing temperature (°C) | Category |
|---|---|---|---|
| Thin paper | (52-29g/m$^2$) | 130 | Category 1 |
| Plain paper | (60-90g/m$^2$) | 135 | Category 2 |
| Plain paper + | (91-105g/m$^2$) | 140 | Category 3 |
| Thick paper 1 | (106-120g/m$^2$) | | |
| Thick paper 1+ | (121-157g/m$^2$) | | |
| Thick paper 2 | (158-209g/m$^2$) | | |
| Thick paper 3 | (210-256g/m$^2$) | 145 | Category 4 |
| Thick paper 4 | (257-300g/m$^2$) | | |

FIG. 7C Sheet conveyance speed

| Sheet type | | Sheet conveyance speed (mm/s) | Category |
|---|---|---|---|
| Thin paper | (52-29g/m$^2$) | 165 | Category 1 |
| Plain paper | (60-90g/m$^2$) | | |
| Plain paper + | (91-105g/m$^2$) | | |
| Thick paper 1 | (106-120g/m$^2$) | 82.5 | Category 2 |
| Thick paper 1+ | (121-157g/m$^2$) | | |
| Thick paper 2 | (158-209g/m$^2$) | | |
| Thick paper 3 | (210-256g/m$^2$) | | |
| Thick paper 4 | (257-300g/m$^2$) | | |

FIG. 14

| Sheet type setting mode | Cumulative count of sheets passing through | Number of jams | Jam occurrence rate |
|---|---|---|---|
| Automatic discrimination mode | 50,000 sheets | 20 | 0.04 % |
| User specified mode | 45,000 sheets | 60 | 0.13 % |

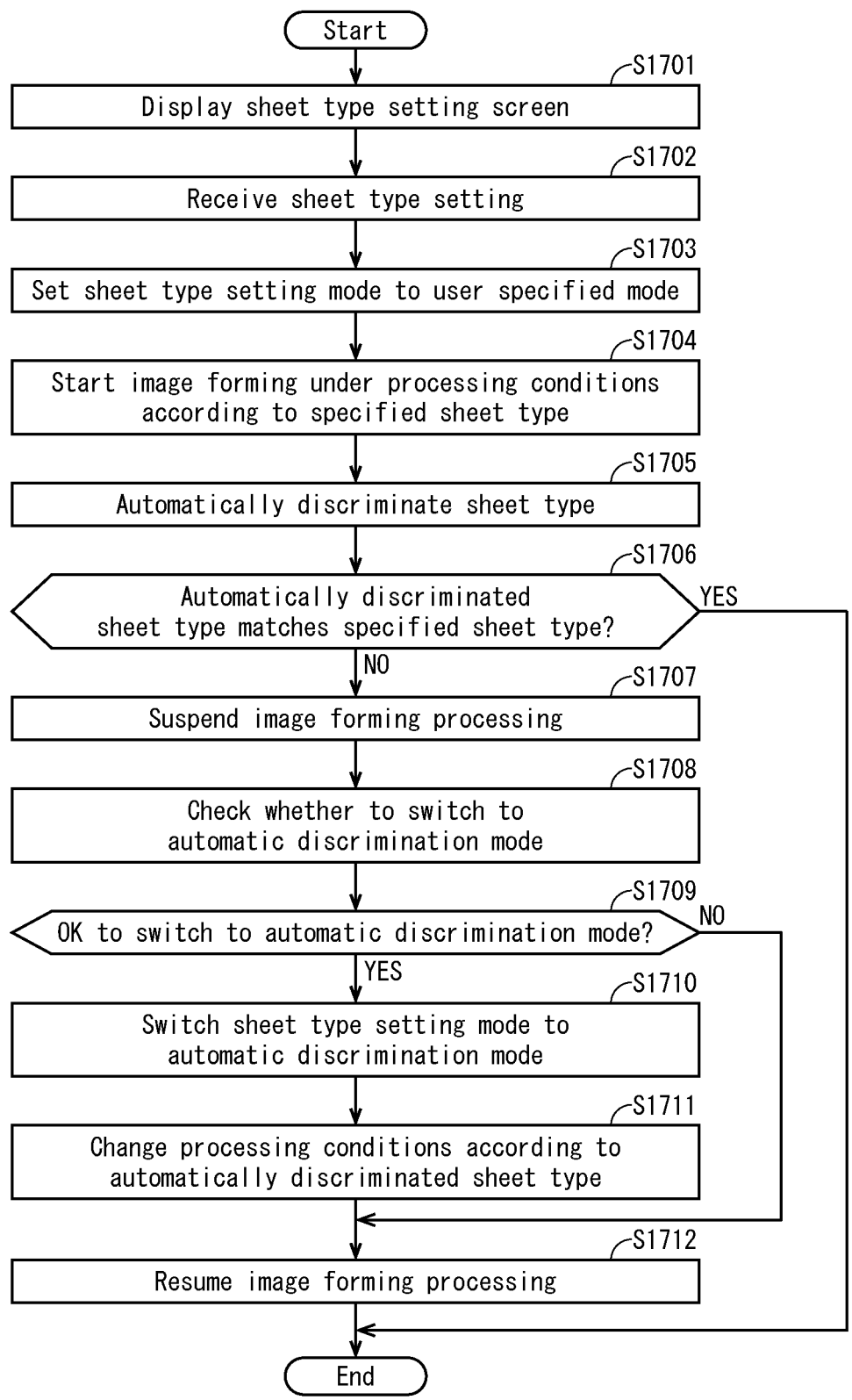

FIG. 18A Example of user confirmation display for whether to switch to automatic discrimination mode
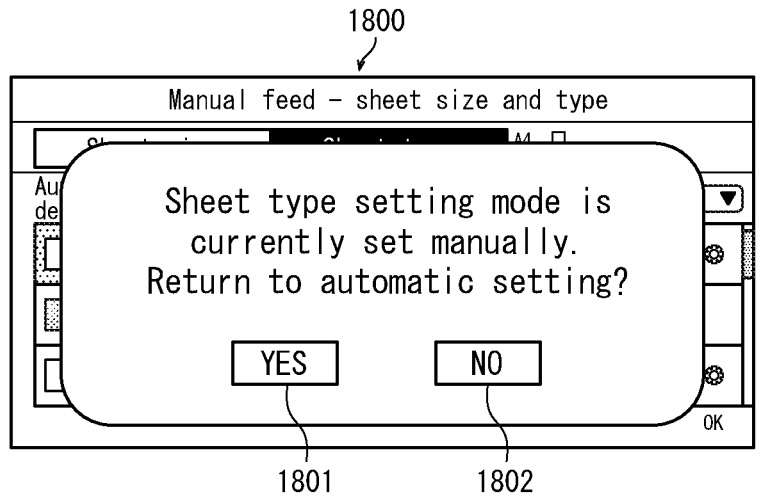
FIG. 18B Example of confirmation display with additional check box
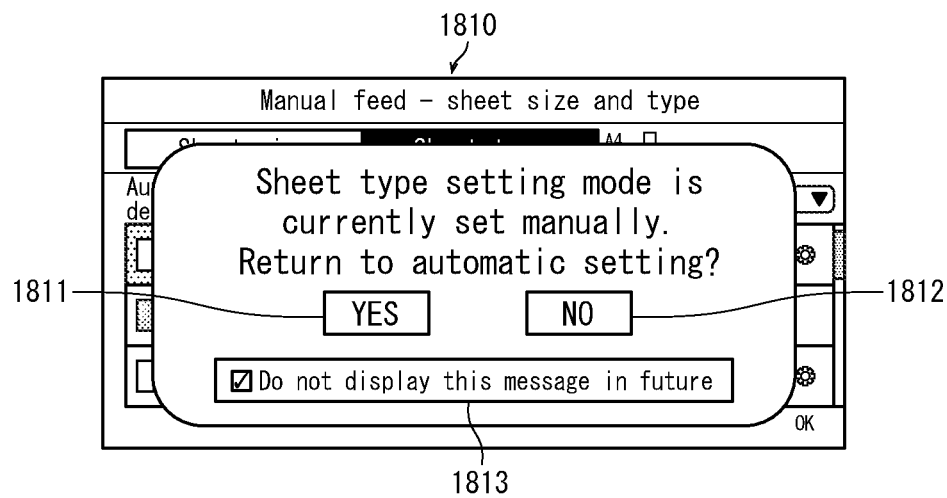
FIG. 18C Display example when forcibly switching to automatic discrimination mode
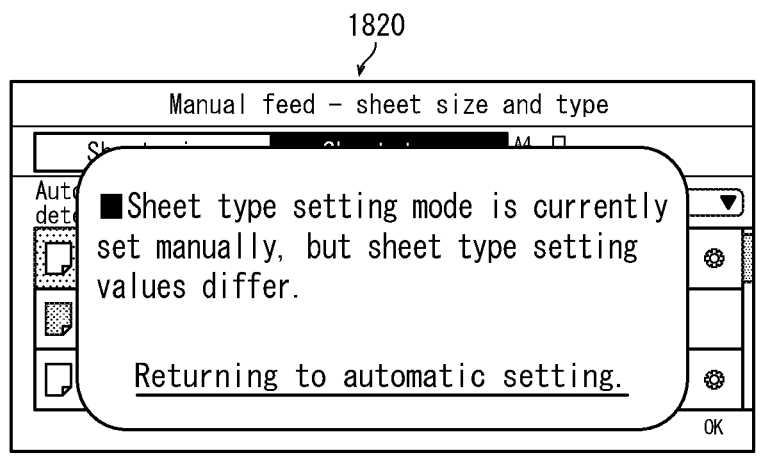

IMAGE FORMING DEVICE

CROSS-REFERENCE TO RELATED APPLICATION

The entire disclosure of Japanese Patent Application No. 2021-034192, filed on Mar. 4, 2021, is incorporated herein by reference.

BACKGROUND

Technical Field

The present disclosure relates to image forming devices and in particular to techniques for setting appropriate sheet type to be used in image forming.

Description of Related Art

In recent years, the needs of users with respect to electrophotographic image forming devices has diversified, and one such need relates to diversification of sheet types. In addition to plain paper, there are a wide variety of sheets that users want to use for image forming, such as thick paper such as postcards and envelopes where sheets overlap, and image forming devices are required to form high quality images on this wide variety of sheet types.

Processing conditions for forming a high quality image vary depending on the type of sheet, and therefore in order to form a high quality image on various sheets, processing conditions must be set according to properties of the sheet. For this reason, image forming devices include operation panels (graphical user interface (GUI)) that allow users to specify sheet type.

However, sheet type should not be always specified using a GUI because it is time-consuming and requires attention from a user of the image forming device. In particular, it is not always easy for a user who lacks sufficient knowledge about the sheet and the image forming device to properly specify sheet type, and if sheet type specified by a user does not match sheet type stored in a sheet feed cassette, appropriate processing conditions cannot be set, and therefore a high quality image cannot be formed (for example, see JP 2007-62963).

To deal with such issues, a technique has been developed to discriminate sheet type using a sensor to detect sheet thickness and quality of sheet supplied from a sheet feed tray of the image forming device, and set processing conditions. By adopting this technique, appropriate processing conditions can be automatically set without bothering the user.

In general, image forming devices are often shared by multiple users, and among the multiple users there may be users familiar with sheet types and how to specify them, while others may not have such familiarity.

In order to accommodate users of various skill levels, an image forming device can switch between a user specified mode for receiving specification of a sheet type and an automatic discrimination mode that discriminates sheet type using a sensor, as setting modes that set sheet type of a sheet.

However, for example, novice users often execute image forming without checking a sheet type setting mode. For this reason, if image forming is executed intending to use an automatic discrimination mode without noticing that sheet type has been specified in a user specified mode, there is a risk that a sheet is not specified correctly, and therefore processing conditions cannot be set appropriately, and normal print results are not obtained, such as image quality deterioration.

In such a case, it is time-consuming and troublesome for a novice user to correctly specify sheet type while still in the user specified mode, and if a novice user makes a mistake in specifying sheet type, there is a risk that normal print results cannot be obtained over and over again. Further, even if an attempt is made to switch setting mode from the user specified mode to the automatic discrimination mode, some novice users do not know how to switch setting mode or do not know that setting mode can be switched in the first place.

Sheet types that an image forming device can correctly discriminate using the sensor are limited, and therefore if a sheet other than one set in the specifications is used, processing conditions might not be set appropriately. Further, if a sensor does not operate normally due to a malfunction or the like, correctly discriminating sheet type become difficult, and therefore processing conditions cannot be set appropriately.

If processing conditions are not set appropriately, in addition to deterioration of image quality, productivity may be reduced and paper jams may occur, and even for an experienced user it can be difficult to determine that the cause is sheet type being incorrectly automatically determined, and to appropriately specify sheet type, and it almost impossible for a novice user.

SUMMARY

One or more embodiments of the present disclosure provide an image forming device that can reduce sheet type setting mistakes to appropriately execute image forming without impairing user operability.

An image forming device reflecting an aspect of the present disclosure is an image forming device including a sheet feeder, an automatic discrimination unit (i.e., a controller), a specification receiver (i.e., the controller), an image former (i.e., an image forming device), and a switcher (i.e., the controller). The sheet feeder feeds out a sheet. The automatic discrimination unit discriminates sheet type of sheets that are fed out. The specification receiver receives specification of sheet type from a user. The image former has two setting modes, an automatic discrimination mode in which an image is formed according to a sheet type discriminated by the automatic discrimination unit, and a user specified mode in which an image is formed according to a sheet type received by the specification receiver. The switcher automatically switches from one of the two setting modes to the other based on a defined condition.

In this way, it is possible to reduce mistakes in setting sheet type and appropriately execute image forming processing without impairing user operability.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the invention. In the drawings:

FIG. 2A is a diagram illustrating arrangement of media detection sensor 120 along a sheet conveyance path of image forming device 1, and FIG. 2B is a diagram illustrating main structure of media detection sensor 120.

FIG. 3 is a table illustrating basis weight ranges corresponding to sheet types for each shipping destination of image forming device 1.

FIG. 6A is a diagram illustrating sheet type setting screen 600 in which sheet type setting mode is a user specified mode, and FIG. 6B is a diagram illustrating sheet type setting screen 600 in which sheet type setting mode is an automatic discrimination mode.

FIG. 7A is a table listing secondary transfer voltage in a normal temperature and humidity environment for each sheet type, FIG. 7B is a table listing fixing temperature in a normal temperature and humidity environment for each sheet type, and FIG. 7C is a table listing sheet conveyance speeds for each sheet type.

FIG. 14 is a table illustrating jam occurrence rate calculation examples for each sheet type setting mode.

FIG. 17 is a flowchart illustrating an operation in which image forming device 1 according to Embodiment 6 switches a sheet type setting mode according to whether or not a sheet type automatically determined by image forming device 1 matches a sheet type specified by a user.

FIG. 18A is a diagram illustrating a display example for accepting input from a user as to whether to switch sheet type setting mode to automatic discrimination mode when an automatically discriminated sheet type and a sheet type specified by a user do not match. FIG. 18B is a diagram illustrating a display example in which a checkbox for accepting an instruction to not display the message in the future is added to the display example of FIG. 18A. FIG. 18C is a diagram illustrating a display example where sheet type setting mode is forcibly switch to automatic discrimination mode.

DETAILED DESCRIPTION

Figure 1:
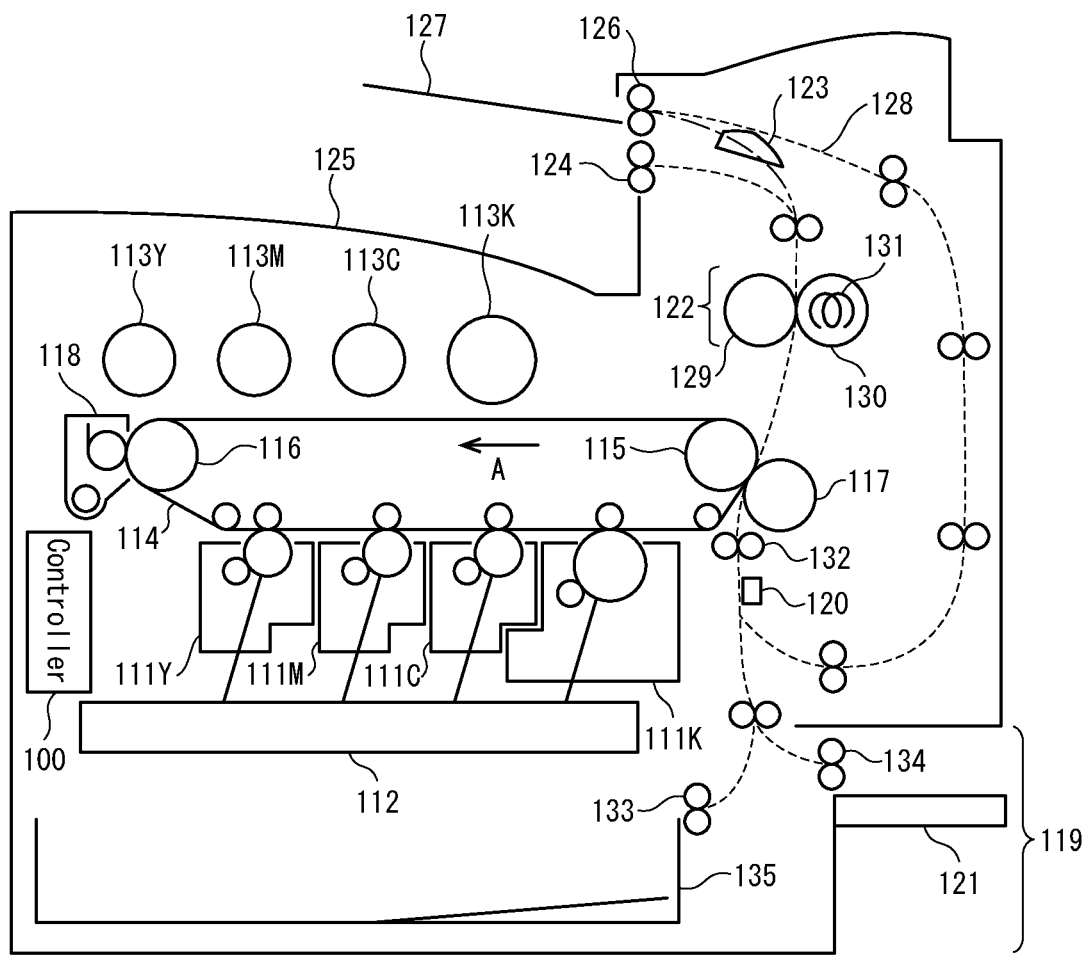
FIG. 1 is a diagram illustrating main structure of an image forming device according to Embodiment 1.

Hereinafter, embodiments of the present invention will be described with reference to the drawings. However, the scope of the invention is not limited to the disclosed embodiments.

(1) An image forming device of one or more embodiments comprises: a sheet feeder that feeds a sheet; a controller that: discriminates a sheet type of the sheet, and receives a user input to specify a sheet type; and including an automatic discrimination mode in which an image is formed based on the discriminated sheet type and a user specified mode in which an image is formed based on the sheet type specified by the user input. The controller automatically switches one of the two setting modes to the other based on a defined condition.

(2) In one or more embodiments, the defined condition is that when the image is being formed under the one of the two setting modes, a possibility that a sheet type setting is incorrect is higher than when the image is being formed under the other of the two setting modes.

(3) In one or more embodiments, the controller issues a notification when switching the one of the two setting modes.

(4) In one or more embodiments, the controller issues the notification by an operation panel.

(5) In one or more embodiments, the controller switches the one of the two setting modes only when the one of the two setting modes is the user specified mode.

(6) In one or more embodiments, the controller switches the one of the two setting modes only when the one of the two setting modes is the automatic discrimination mode.

(7) In one or more embodiments, the controller uses a plurality of determination criteria as the defined condition for switching the user specified mode to the automatic discrimination mode.

(8) In one or more embodiments, the image forming device further comprises an operation panel that has a reset key, the defined condition is that the reset key is pressed, and based on the defined condition, the controller switches only the user specified mode to the automatic discrimination mode.

(9) In one or more embodiments, the controller measures an elapsed time since a user operation is received, the defined condition is that the elapsed time reaches a defined time, and based on the defined condition, the controller switches only the user specified mode to the automatic discrimination mode.

(10) In one or more embodiments, the image forming device further comprises a timing detector that detects a timing at which the sheet passes through a sheet conveyance path, the controller determines presence or absence of an indication of jam occurrence, depending on whether the timing detected by the timing detector is delayed within a defined range from a timing detected when the sheet is normally conveyed, the defined condition is that the controller determines the presence of the indication of jam occurrence, and based on the defined condition, the controller switches only the user specified mode to the automatic discrimination mode.

(11) In one or more embodiments, the controller acquires a jam occurrence rate for each sheet type, the defined condition is that the jam occurrence rate of the sheet type specified by the user input is higher than a defined threshold, and based on the defined condition, the controller switches only the user specified mode to the automatic discrimination mode.

(12) In one or more embodiments, the controller acquires a jam occurrence rate for each of the two setting modes, the defined condition is that the jam occurrence rate in the user specified mode is higher than the jam occurrence rate in the automatic discrimination mode, and based on the defined condition, the controller switches only the user specified mode to the automatic discrimination mode.

(13) In one or more embodiments, the sheet feeder includes: a sheet storage that stores the sheet, the controller determines whether the sheet has been supplied to the sheet storage depending on whether the sheet is already stored in the sheet storage, the defined condition is that the controller determines that the sheet has been supplied, and based on the defined condition, the controller switches only the user specified mode to the automatic discrimination mode.

(14) In one or more embodiments, the defined condition is that the sheet type specified by the user input does not match the discriminated sheet type, and based on the defined condition, the controller switches only the user specified mode to the automatic discrimination mode.

(15) In one or more embodiments, the controller estimates whether there is image quality deterioration in the image formed under the user specified mode due to a difference between the sheet type specified by the user input and the discriminated sheet type, the defined condition is that the controller estimates that there is the image quality deterioration, and based on the defined condition, the controller switches only the user specified mode to the automatic discrimination mode.

(16) In one or more embodiments, the controller estimates that there is the image quality deterioration when a processing condition corresponding to the sheet type specified by the user input do not match a processing condition corresponding to the discriminated sheet type.

(17) In one or more embodiments, the controller can prohibit switching from the user specified mode to the automatic discrimination mode.

(18) In one or more embodiments, the controller: acquires a jam occurrence rate, and prohibits switching from the user specified mode to the automatic discrimination mode when the jam occurrence rate is lower than a defined threshold.

(19) In one or more embodiments, upon receiving an instruction to prohibit discriminating the sheet type, the controller prohibits switching from the user specified mode to the automatic discrimination mode.

(20) In one or more embodiments, the controller: can discriminate sheet types of a predetermined range, and prohibits switching from the user specified mode to the automatic discrimination mode when the sheet type specified by the user input is outside the predetermined range.

(21) In one or more embodiments, the controller: receives an instruction with a user authority or an administrator authority, the instruction indicating whether to discriminate the sheet type, prohibits automatically discriminating the sheet type when receiving, as the instruction, an instruction not to automatically discriminate the sheet type, and prioritizes the instruction with the administrator authority over the instruction with the user authority.

(22) In one or more embodiments, the controller has a plurality of methods of indicating that the one of the two setting modes is switched.

(23) In one or more embodiments, the controller judges whether the sheet type is discriminated normally, the defined condition is that the controller judges that the sheet type is not discriminated normally, and based on the defined condition, the controller switches only the automatic discrimination mode to the user specified mode.

(24) In one or more embodiments, the controller judges a quality of a printing result by reading the image formed by the image forming device, the defined condition is that the controller judges that the quality of the printing result does not reach a predetermined level, and based on the defined condition, the controller switches only the user specified mode to the automatic discrimination mode.

(25) In one or more embodiments, the controller estimates a basis weight of the sheet and discriminates the sheet type based on the basis weight.

(26) In one or more embodiments, the controller estimates the basis weight of the sheet from a transmittance and a reflectance measured by irradiating the sheet with light.

Embodiment 1

If a user of an image forming device manually sets sheet type and executes image forming, then leaves the sheet type setting as is and leaves the image forming device, then another user does not check sheet type setting and executes image forming, there is a risk of a desired image quality not being achieved. In such a case, a novice user who is not familiar with the image forming device may not even know the reason why the desired image quality could not be achieved, significantly reducing convenience.

To deal with this issue, according to at least one embodiment, after a user manually sets sheet type, if image forming is not executed for a defined period, sheet type setting reverts to automatic discrimination. This makes it possible to form a high quality image without need for the knowledge to check paper type setting or the labor to do so.

(1-1) Image Forming Device Structure

The following describes structure of an image forming device according to at least one embodiment.

As illustrated in FIG. 1, the image forming device 1 according to at least one embodiment is a tandem type of color printer and includes imaging units 111Y, 111M, 111C, and 111K that form yellow (Y), magenta (M), cyan (C), and black (K) color toner images, respectively.

Each of the imaging units 111Y, 111M, 111C, and 111K includes a photosensitive drum, a charging device, a developing device, a primary transfer roller, and a cleaning device. The charging device uniformly charges an outer circumferential surface of the photosensitive drum. An exposure unit 112 forms electrostatic latent images by irradiating the outer circumferential surfaces of the photosensitive drums with laser beams modulated according to an image to be formed.

In the image forming device 1, toner bottles 113Y, 113M, 113C, and 113K containing YMCK color toner, respectively, are detachably attached, and supply toner to the developing devices of the imaging units 111Y, 111M, 111C, and 111K. The developing devices develop the electrostatic latent images by supplying toner to the outer circumferential surfaces of the photosensitive drums. The primary transfer rollers electrostatically transfer toner images from the outer circumferential surfaces of the photosensitive drums to an outer circumferential surface of an intermediate transfer belt 114 (primary transfer).

The imaging units 111Y, 111M, 111C, and 111K transfer the toner images of each color YMCK so the toner images overlap on the outer circumferential surface of the intermediate transfer belt 114, such that a color toner image is formed on the outer circumferential surface of the intermediate transfer belt 114. When forming a monochrome toner image, only one color of toner image is transferred onto the outer circumferential surface of the intermediate transfer belt 114, and other colors of toner image are not formed.

The intermediate transfer belt 114 is an endless belt, kept taut around a drive roller 115, a driven roller 116, and primary transfer rollers of the imaging units 111Y, 111M, 111C, and 111K, and travels in a direction indicated by arrow A. The drive roller 115 is pressed against a secondary transfer roller 117 with the intermediate transfer belt 114 sandwiched between to form a secondary transfer nip. The intermediate transfer belt 114 travels in the direction of the arrow A to convey the toner image carried on the outer circumferential surface to the secondary transfer nip.

A stack of sheets is housed in a sheet feed tray (or a sheet storage) 135 of a sheet feeder 119. Further, a stack of sheets may be placed on a manual sheet feed tray (or a sheet storage) 121. From these sheet stacks, sheets can be conveyed in order from a topmost sheet in a stack towards the secondary transfer nip at the same timing as toner images are conveyed to the secondary transfer nip.

The sheets pass through a detection position of a media detection sensor 120 when conveyed from the sheet feed tray 135 or the manual sheet feed tray 121 to the secondary transfer nip. According to at least one embodiment, the media detection sensor 120 outputs a signal indicating basis weight of a sheet. A controller 100 estimates sheet type with reference to the output signal of the media detection sensor 120. The media detection sensor 120 may output a signal indicating a property other than basis weight of a sheet.

Sheets reach a timing roller 132 after passing the detection position of the media detection sensor 120. The timing roller 132 stops rotating when a sheet arrives, the sheet is conveyed further with its tip abutting against a conveyance nip of the timing roller 132 until a bend forms in the sheet, which corrects skew. The timing roller 132 is rotationally driven in accordance with conveyance timing of the toner image by the intermediate transfer belt 114, conveying the sheet to the secondary transfer nip.

A transfer bias is applied to the secondary transfer roller 117, and the toner image is electrostatically transferred from the outer circumferential surface of the intermediate transfer belt 114 onto the sheet (secondary transfer). A sheet onto which the toner image is transferred is conveyed to a fixing unit 122, where the toner image is heat fixed.

The fixing unit 122 includes a pressure roller 129, a fixing roller 130, and a halogen heater 131. The pressure roller 129 is urged towards the fixing roller 130 by using an urging member (not illustrated). According to this urging, the pressure roller 129 is pressed against the fixing roller 130 to form a fixing nip. The halogen heater 131 heats the fixing roller 130 to raise the temperature.

When the pressure roller 129 is rotationally driven by a drive source (not illustrated), the fixing roller 130 is driven by the pressure roller 129 to rotate. Due to this rotation, the sheet is passed through the fixing nip. When the sheet is passed through the fixing nip while the fixing roller 130 is heated, the toner image on the sheet is melted and pressure bonded to the sheet (heat fixed).

Instead of the fixing roller 130, a fixing rotating body other than the fixing roller 130 may be used, such as a fixing belt. Further, a pressure member other than the pressure roller 129, such as a pressure pad, may be pressed against the fixing rotating body. When a pressure pad is used as the pressure member, the fixing rotating body may be rotationally driven by using a drive source.

The fixing rotating body may be heated by using an induction heater (IH) or the like as a heat source instead of the halogen heater 131, and temperature adjusted to be a fixing temperature according to sheet type. Temperature adjustment is performed, for example, by repeatedly measuring surface temperature of a fixing member and using feedback to control output of the heat source according to the measured surface temperature.

To explain the relationship between fixing processing and sheet, thick paper has a larger basis weight and therefore a larger heat capacity than plain paper, and therefore when heat fixing a toner image onto thick paper, fixing temperature is made higher and sheet conveyance speed (system speed) is made slower than when fixing a toner image onto plain paper. When fixing temperature is raised, the amount of heat applied to the sheet during heat fixing increases, so that the toner image can be reliably melted even if heat capacity of the sheet is large.

Further, when sheet conveyance speed is slowed down, sheets are conveyed more slowly, and therefore heat fixing is executed over a corresponding amount of time. Therefore, the amount of heat applied to the sheet during heat fixing increases, so that the toner image can be reliably melted even if heat capacity of the sheet is large. The fixing temperature and sheet conveyance speed constitute processing conditions (image forming conditions).

Further, processing conditions also include secondary transfer bias for transfer of toner to the sheet. When type and basis weight of a sheet are different, volume resistance and surface resistance of the sheet are different, and therefore optimum secondary transfer bias is also different. Therefore the secondary transfer bias may be set as well as fixing temperature and sheet conveyance speed according to sheet type.

A switcher 123 switches conveyance direction of the sheet on which the toner image is heat fixed. When forming an image on a back surface of the sheet, the switcher 123 guides the sheet to a reversing roller 126. When the reversing roller 126 conveys the sheet until a portion of the sheet advances onto a switchback tray 127, an orientation of the switcher 123 is switched.

Subsequently, when the reversing roller 126 reverses rotation direction, the sheet is sent to a double-sided reversing path 128. The sheet sent to the double-sided reversing path 128 is conveyed again to the secondary transfer nip, a toner image is transferred to a reverse side of the sheet, and the toner image is heat fixed.

When single-sided printing and double-sided printing are completed, the switcher 123 guides the sheet to an ejection roller 124. The ejection roller 124 ejects sheets onto an ejection tray 125.

The controller 100 monitors and controls operation of the image forming device 1. In particular, processing conditions are set according to sheet type estimated by referring to the output signal of the media detection sensor 120 or sheet type set by a user. Further, as described later, when it is determined that sheet type is not set correctly, sheet type can be set correctly by switching the sheet type setting method.

The image forming device 1 includes an operation panel 410, and a user of the image forming device 1 can operate the operation panel 410 such that the controller receives instructions (or user inputs) to specify sheet type or switch sheet type setting mode.

(1-2) Media Detection Sensor 120

The following describes the media detection sensor 120.

The image forming device 1 has two setting modes for sheet type setting operation. One is a user specified mode in which a user of the image forming device 1 specifies sheet type by a user input/operation via the operation panel 410, and the other is an automatic discrimination mode in which the image forming device 1 discriminates sheet type without any user operation. In the automatic discrimination mode, the image forming device 1 automatically discriminates sheet type by using the media detection sensor 120.

As illustrated in FIG. 2A, the media detection sensor 120 is disposed immediately downstream in a sheet conveyance direction of a confluence position of a sheet feed path 211 from the sheet feed tray 135 and a sheet feed path 213 from the manual sheet feed tray 121, and upstream from the timing roller 132. When the sheet feed tray 135 is organized into multiple stages, the media detection sensor 120 is disposed downstream of a confluence position of a sheet feed path 212 from second and subsequent stages of the sheet feed tray and the sheet feed paths 211, 213.

According to at least one embodiment, the media detection sensor 120 is attached to conveyance guide plates 221, 222 that guide sheets to the timing roller 132, but may be fixed to another member. In this way, the media detection sensor 120 can be used to discriminate sheet type regardless of whether a sheet is fed by any of the sheet feed paths 211, 212, 213.

As illustrated in FIG. 2B, the media detection sensor 120 includes a light emission substrate 231 and a light emission and reception substrate 241. A light emitting diode (LED) 232 that emits near-infrared light IR and an LED 233 that emits blue light B are mounted on the light emission substrate 231. The light IR and light B of the LED 232, 233 are incident on a sheet S via a through hole 224 provided in the conveyance guide plate 222. A portion of light incident on the sheet S is transmitted through, towards the light emission and reception substrate 241.

Further, an LED 242 that emits green light G and a photodiode 243 that outputs a detection signal according to an amount of light incident thereon are mounted on the light emission and reception substrate 241. Emitted light G from the LED 242 is incident on the sheet S via the through hole 223 provided in the conveyance guide plate 221. A portion of light incident on the sheet S is reflected towards the photodiode 243.

When there is no sheet S on an optical path of the near infrared light IR and the blue light B from the LED 232, 233 to the photodiode 243, the near infrared light IR and the blue light B are unobstructed by a sheet S and directly incident on the photodiode 243. Based on this amount of incident light, transmittance of the near infrared light IR and the blue light B is evaluated for each sheet.

A reflective light source reference plate 251 is disposed at a position where the emitted light G of the LED 242 is incident on a surface of the conveyance guide plate 222 facing the light emission and reception substrate 241. When there is no sheet S on an optical path of the green light G from the LED 242 to the reflective light source reference plate 251 and no sheet S on an optical path of the green light G from the reflective light source reference plate 251 to the photodiode 243, the green light G is unobstructed by a sheet S, reflected by the reflective light source reference plate 251 and incident on the photodiode 243. Based on this amount of incident light, transmittance of the green light G is evaluated for each sheet.

Transmittance and reflectance of the near infrared light IR, the blue light B, and the green light G may differ depending on basis weight of a sheet S, and therefore by referring to the detection signal of the photodiode 243, calculating transmittance of the near infrared light IR and the blue light B, and calculating reflectance of the green light G, basis weight of the sheet S can be determined.

FIG. 3 is a table illustrating correspondence between sheet basis weight and sheet type. Correspondence between basis weight and sheet type is not necessarily universal and may vary from geographic region to region. For example, in Japan, sheet type corresponding to basis weight calculated by using the media detection sensor 120 is determined by referring to a basis weight range illustrated in a "threshold adjustment (metric destination)" column of FIG. 3.

Further, in the United States, sheet type is determined by referring to a basis weight range illustrated in a "threshold adjustment (inches destination)" column, in Europe, sheet type is determined by referring to a basis weight range illustrated in a "threshold adjustment (Europe destination)" column, and therefore processing conditions can be set according to the needs of users in the geographic region.

(1-3) Structure of Controller 100

The following describes structure of the controller 100.

Figure 4:
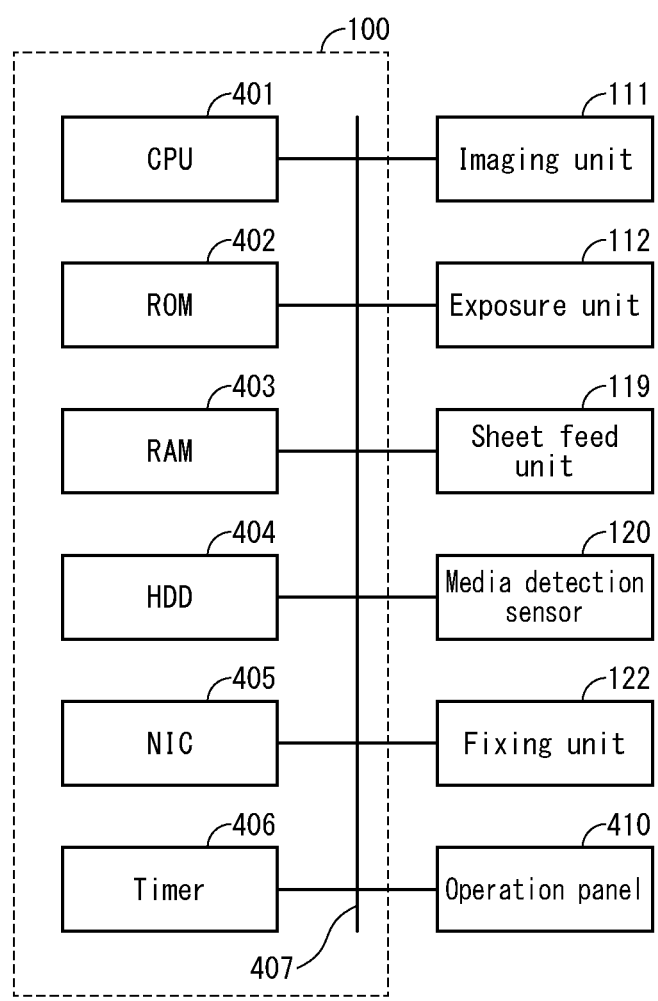
FIG. 4 is a block diagram illustrating a main structure of controller 100.

As illustrated in FIG. 4, a central processing unit (CPU) 401 includes a read-only member (ROM) 402 that is a non-volatile memory, a random access memory (RAM) 403 that is volatile memory, and the like, connected by an internal bus 407 so as to communicate with each other.

When the CPU 401 is reset by input of a reset signal, such as when the image forming device 1 is powered on, a boot program is read from the ROM 402 and started, and using the RAM 403 as a working storage, an operating system (OS) and control program are read from a hard disk drive (HDD) 404 and executed. Instead of the HDD 404, a solid state drive (SSD) may be used as an auxiliary storage device.

A network interface card (NIC) 405 executes processing for communicating with other devices via a communication network such as a local area network (LAN) or the Internet. As a result, the image forming device can receive an image forming job or the like from another device. An image forming job may include setting sheet type used in image forming processing.

A timer 406 is used to specify current time and to measure elapsed time such as sheet conveyance time. According to at least one embodiment, in particular, after receiving a time setting and being instructed to start timing, the timer 406 inputs a timer interrupt to the CPU 401 when a set time elapses. According to this timer interrupt, the CPU 401 detects a timeout of the set time.

The controller 100 uses the operation panel 410 to present information to a user of the image forming device 1 and receive instructions input from a user. For example, the controller 100 receives an instruction from a user to execute image forming processing, or receives a setting of sheet type to use for image forming processing. When the sheet feeder 119 includes a plurality of sheet feed trays, specification of sheet type housed in each sheet feed tray may be received. Further, when feeding from the manual sheet feed tray 121, the operation panel 410 is used to accept user specification of sheet type.

Figure 5:
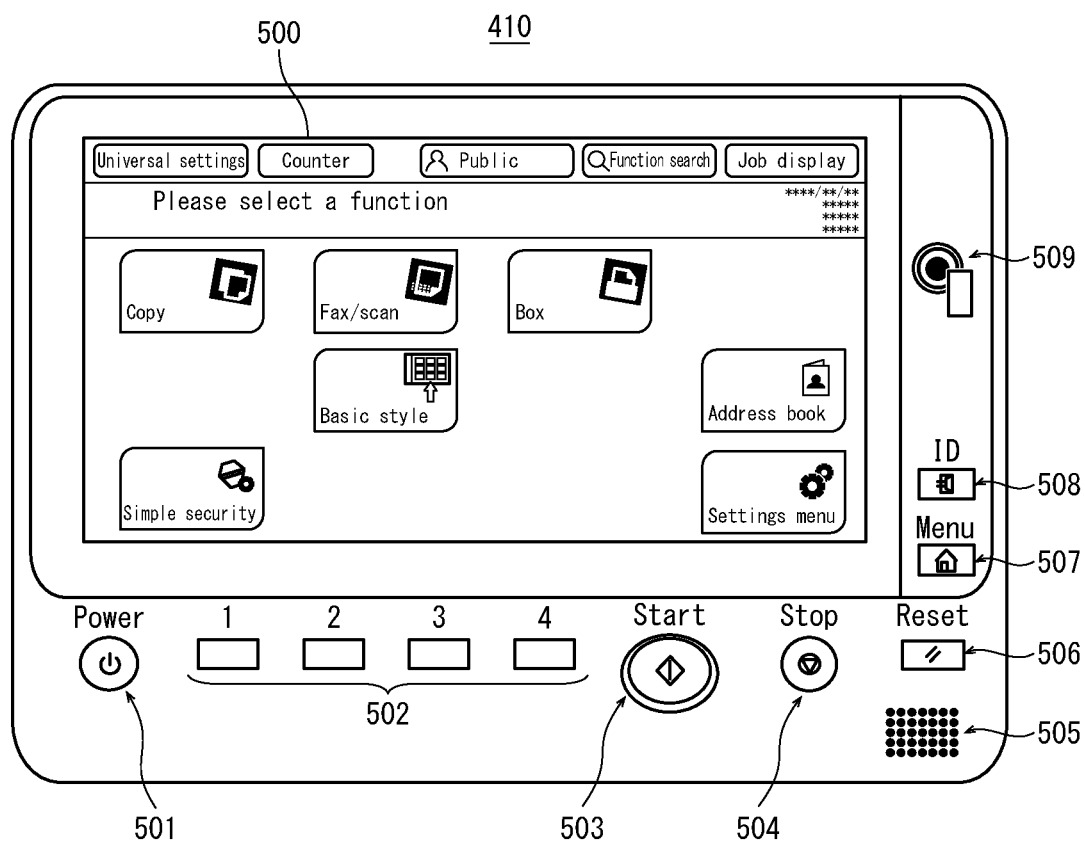
FIG. 5 is a plan view diagram illustrating a main structure of operation panel 410.

As illustrated in FIG. 5, the operation panel 410 includes a touch panel 500, a power key 501, a hard key 502, a start key 503, a stop key 504, a speaker 505, a reset key 506, a menu key 507, and an ID key 508. The touch panel 500 includes a liquid crystal display (LCD) and a touch pad, and displays a screen to a user of the image forming device 1 and receives touch input from a user.

The power key 501 is a key for turning on power of the image forming device 1, and the hard key 502 can be customized by a user to set a function to be executed when pressed. The start key 503 is a key for starting processing execution after a user completes setting execution conditions of a process such as copying. The stop key 504 is a key for stopping a process such as image forming that is being executed.

The speaker 505 is for outputting audio to a user. The reset key 506 is a key for resetting a setting displayed on screen. The menu key 507 is a key for displaying a top menu. In the top menu illustrated in FIG. 5, buttons corresponding to functions that can be used by a user of the image forming device 1 are displayed, and by pressing the button, settings can be made related to the function corresponding to the button.

The ID key 508 is a key for starting an authentication process when the operation panel 410 is in a logged out state and for logging out when the operation panel 410 is in a logged in state. Further, the operation panel 410 includes a short range wireless communication interface 509 for linking with a mobile terminal or the like.

Using the operation panel 410, the controller 100 receives specification of sheet type from a user of the image forming device 1, and receives instruction to switch sheet type setting mode as described later. Further, the controller 100 monitors states of the imaging units 111Y, 111M, 111C, and 111K, the exposure unit 112, the sheet feeder 119, the fixing unit 122, and the like, and controls their operations.

Further, the controller 100 automatically discriminates sheet type by controlling turning on and off of the LEDs 232, 233, 242 of the media detection sensor 120 and referring to the output signal of the photodiode 243.

(1-4) Sheet Type User Setting

The following describes a case in which a user of the image forming device 1 manually sets sheet type used for image forming processing by using the operation panel 410.

The sheet type setting screen 600 illustrated in FIG. 6A is an example screen displayed on the touch panel 500 of the operation panel 410 in order to allow a user to set sheet type supplied from the manual sheet feed tray 121.

A similar screen is displayed on the touch panel 500 of the operation panel 410 when a user is to set a sheet type supplied from the sheet feed tray 135. The situation with the sheet feed tray 135 is the same as that of the manual sheet feed tray 121, and therefore description of one is interchangeable with the other.

On the sheet type setting screen 600, a character string "manual feed sheet size/type" is displayed as a title 601 indicating that the screen is for setting sheet type supplied from the manual sheet feed tray 121.

A toggle button 602 is a button for selecting whether to display a setting screen for sheet size or sheet type. In the example of FIG. 6A, a character string "sheet type" is highlighted, indicating that the screen is for setting sheet type.

The display 603 uses an icon and character string to indicate that currently set sheet size is "A4" and sheet type is "plain paper".

A toggle switch 604 is a switch for switching whether or not to automatically detect sheet type. In the example of FIG. 6A, a character string "OFF" is displayed indicating a state of the toggle switch 604, sheet type setting mode is user specified mode, and sheet type is set by a user using the setting screen or using default settings. As illustrated in FIG. 6B, when a character string "ON" is displayed indicating state of the toggle switch 614, sheet type is automatically detected. That is, sheet type setting mode is switched to the automatic discrimination mode, and sheet type is estimated using an output signal of the media detection sensor 120.

A drop down list 605 is a list for specifying sheet type of custom sheets. According to at least one embodiment, clicking the drop down list 605 displays a list of sheet basis weight ranges. When a user selects a basis weight range displayed in a list that includes a basis weight of a sheet to be used for image forming processing, the controller 100 sets process conditions according to the selected basis weight range.

Processing conditions include secondary transfer voltage, fixing temperature, and sheet conveyance rate, as described above. FIG. 7A is a table for determining secondary transfer voltage from sheet type. According to at least one embodiment, when sheet type is "thin paper (basis weight 52 $g/m^2$ to 59 $g/m^2$)", secondary transfer voltage is set to 1,450 V, and when sheet type is "plain paper (basis weight 60 $g/m^2$ to 90 $g/m^2$)", secondary transfer voltage is set to 1,650 V.

In FIG. 7A, when sheet type is "thick paper 1 (106 $g/m^2$ to 120 $g/m^2$)" or "thick paper 1+ (121 $g/m^2$ to 157 $g/m^2$)", secondary transfer voltage is set to 1,550 V. Further, when sheet type is "thick paper 2 (158 $g/m^2$ to 209 $g/m^2$)" or "thick paper 3 (210 $g/m^2$ to 256 $g/m^2$)" or "thick paper 4 (257 $g/m^2$ to 300 $g/m^2$)", secondary transfer voltage is 1,950 V. As described above, as a result of considering image quality and other circumstances, secondary transfer voltage values may be the same among sheet types that have similar basis weights.

FIG. 7A illustrates settings in a normal temperature and humidity environment in which environmental temperature and environmental humidity of the image forming device 1 are normal. When the environmental conditions of the image forming device 1 are not normal, the setting of secondary transfer voltage may be different for each sheet type. Setting of fixing temperature in FIG. 7B also assumes a normal temperature and humidity environment, and if environmental conditions of the image forming device 1 are not normal, the setting of fixing temperature for each sheet type may differ from the settings in FIG. 7B. This is because if temperature and humidity of sheets or toner change depending on environmental conditions, an amount of heat required to fix a toner image on a sheet may vary.

In FIG. 7B, when sheet type is "thin paper (basis weight 52 $g/m^2$ to 59 $g/m^2$)", fixing temperature is set to 130° C., and when sheet type is "plain paper (basis weight 60 $g/m^2$ to 90 $g/m^2$)", fixing temperature is set to 135° C. Similarly to secondary transfer voltage, when sheet type is "plain paper+ (91 $g/m^2$ to 105 $g/m^2$)", "thick paper 1 (106 $g/m^2$ to 120 $g/m^2$)", "thick paper 1+ (121 $g/m^2$ to 157 $g/m^2$)", or "thick paper 2 (158 $g/m^2$ to 209 $g/m^2$)", a common fixing temperature of 140° C. is set.

FIG. 7C is a table for determining sheet conveyance speed from sheet type. According to at least one embodiment, sheet conveyance speed of the image forming device 1 is switched between two stages: full speed and half speed. When sheet type is "thin paper (basis weigh 52 $g/m^2$ to 59 $g/m^2$)", "plain paper (basis weight 60 $g/m^2$ to 90 $g/m^2$)", or "plain paper+ (basis weight 91 $g/m^2$ to 105 $g/m^2$)", sheet conveyance speed is set to full speed 165 mm/s.

On the other hand, when sheet types are "thick paper 1 (106 $g/m^2$ to 120 $g/m^2$)", "thick paper 1+ (121 $g/m^2$ to 157 $g/m^2$)", "thick paper 2 (158 $g/m^2$ to 209 $g/m^2$)", "thick paper 3 (210 g/m² to 256 g/m²)", or "thick paper 4 (257 g/m² to 300 g/m²)", stiffness of the sheets are high and conveyance resistance is high, and more time is needed to fix a toner image, and therefore sheet conveyance speed is set to a half speed of 82.5 mm/s.

Of course, the secondary transfer voltages, the fixing temperatures, and the sheet conveyance speeds illustrated in FIGS. 7A, 7B, 7C are merely examples and may vary depending on the model of the image forming device 1.

Returning to FIGS. 6A, 6B, a combo box may be used instead of the drop-down list 605. The combo box not only allows a user to select a range of basis weights, as in the drop down list 605, but also allows a user to enter a basis weight value. Similarly, when user input of basis weight is received, the controller 100 can set processing conditions according to the input basis weight.

Buttons 606 cause a sheet type to be selected from among sheet types when a specific sheet type is used for image forming processing. The buttons 606 can be pressed for each button displaying sheet type and basis weight of a sheet. Further, by sliding a scroll bar 607, hidden buttons that are not displayed on screen can be displayed. In this way, a user can select a desired sheet type from a large number of sheet types without being restricted by the display area of the touch panel 500.

When a user presses the OK button 608, the controller sets processing conditions according to the sheet type selected by the user.

If a reset button 610 is pressed while the sheet type setting screen 600 is displayed on the touch panel 500 of the operation panel 410, the sheet type setting is returned to the default setting. The default setting of sheet type may be set at the time of shipment of the image forming device 1, or may be set by an administrator of the image forming device 1 in consideration of usage status of the image forming device 1. According to at least one embodiment, in the default setting, the toggle switch 604 is set to "ON", and sheet type is automatically set.

(1-5) Operation of Image Forming Device 1

The following describes operation of the image forming device 1.

Figure 8:
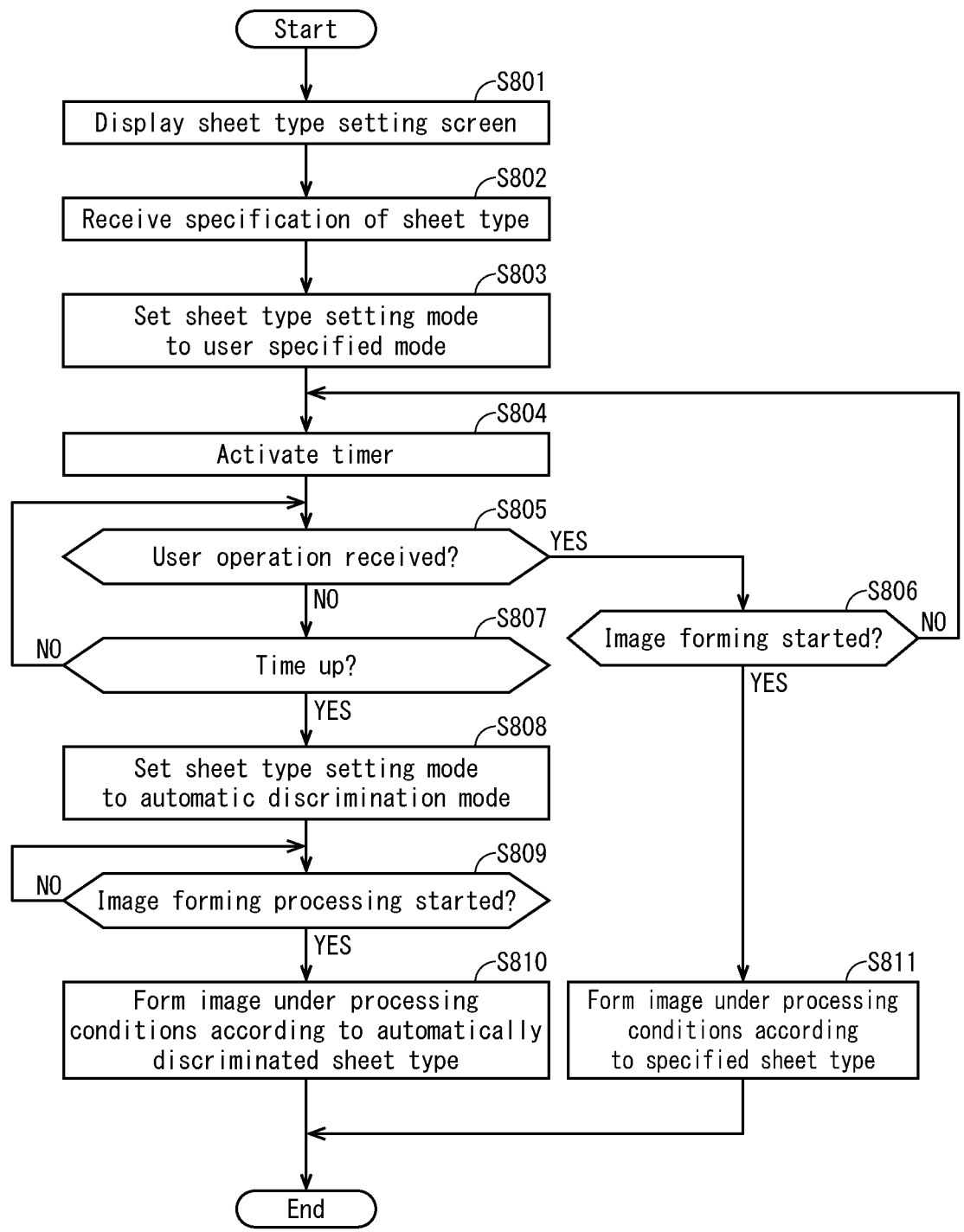
FIG. 8 is a flowchart illustrating an operation in which image forming device 1 according to Embodiment 1 switches sheet type setting mode according to an auto-reset function.

As illustrated in FIG. 8, the image forming device 1 displays the sheet type setting screen 600 according to reception of a user operation on the operation panel 410 (S801), and in addition to receiving sheet type specification on the sheet type setting screen 600 (S802), operation to switch "OFF" the toggle switch 604 is received, and sheet type setting mode is switched to the user specified mode (S803).

Next the timer 406 is activated to start counting up (S804). Time until the end of the count up may be set in advance by an administrator of the image forming device 1, or may be specified by a user who has switched sheet type setting mode to the user specified mode. In this case, at the timing when the toggle switch 604 is switched to "OFF", a GUI element may be displayed on the sheet type setting screen 600 for setting the time until the count up is completed.

Subsequently, when the image forming device 1 receives an operation input from a user ("YES" in S805), and the received operation input is an instruction to start image forming processing ("YES" in S806), image forming processing is executed under processing conditions according to sheet type specified by the user (S811). If an operation input other than a start instruction for image forming processing is received ("NO" in S806), processing returns to step S804, the timer 406 is restarted, and count up is restarted from the beginning (S804).

When no operation input is accepted from a user ("NO" in S805), and the timer value of the timer 406 has not reached a specified value and time-up has not occurred ("NO" in S807), processing proceeds to step S805 and processing is repeated.

On the other hand, when the timer value of the timer 406 reaches a defined value and time-up occurs ("YES" in S807), sheet type setting mode is automatically switched from the user specified mode to the automatic discrimination mode (S808). That is, the image forming device 1 according to at least one embodiment has an auto-reset function with respect to sheet type setting mode.

When sheet type setting mode is switched to the automatic discrimination mode, the display state of the toggle switch 614 in the sheet type setting screen 600 is switched and the character string indicating this is switched to "ON", and it is displayed that sheet type setting mode is switched to the automatic discrimination mode.

Subsequently, upon receiving an image forming processing start instruction according to a user pressing the start key 503 ("YES" in S809), the media detection sensor 120 is used to discriminate sheet type, and image forming processing is executed according to processing conditions based on an obtained sheet type (S810).

As described above, according to the auto-reset function of at least one embodiment, even when sheet type is specified by a user on the sheet type setting screen 600, then when a defined amount of time has elapsed, sheet type setting mode is automatically switched from the user specified mode to the automatic discrimination mode. After the auto reset, if a user other than a user who specified sheet type tries to execute image forming processing using another sheet type, sheet type is discriminated by the automatic discrimination mode and appropriate processing conditions are set, and therefore an image of excellent quality can be formed.

In addition to the auto reset function, sheet type setting mode may be switched from the user specified mode to the automatic discrimination mode when the reset key 506 (see FIG. 5) is pressed while the sheet type setting mode is in the user specified mode.

Embodiment 2

When a user of an image forming device manually sets sheet type and executes image forming processing then leaves the sheet type setting as is and leaves the image forming device, and another user executes image forming processing without checking sheet type settings, then there is a risk that processing conditions are not set appropriately, and a paper jam may therefore easily occur. Therefore, if a sign of a jam is detected, and if sheet type setting mode is switched from the user specified mode to the automatic discrimination mode, the processing conditions can be set appropriately to obtain an image of excellent quality.

(2-1) Structure for Detecting Signs of a Jam

Figure 9:
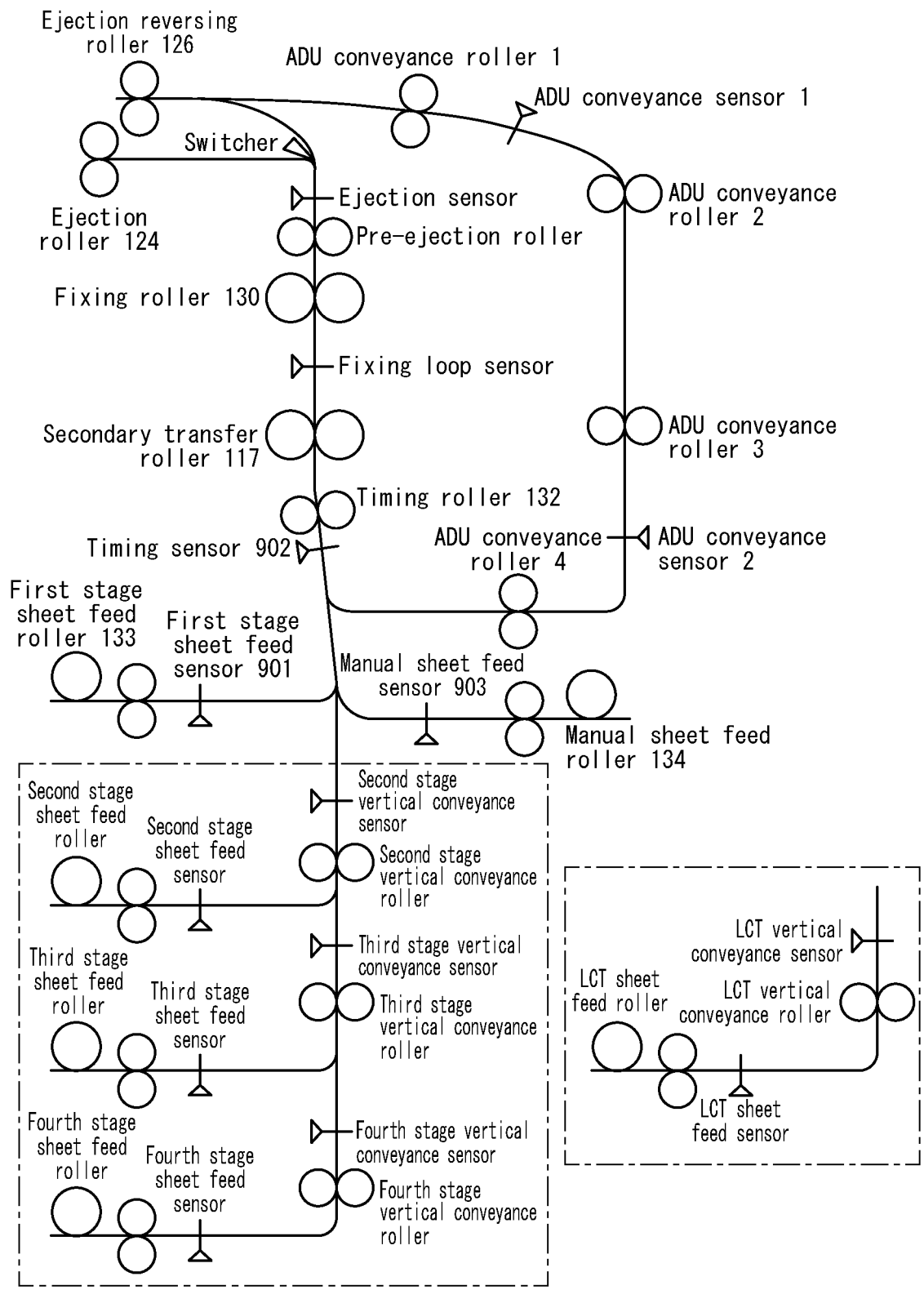
FIG. 9 is a diagram illustrating structure of a sheet conveyance system of image forming device 1 according to Embodiment 2.

As illustrated in FIG. 9, the image forming device 1 includes a first stage sheet feed sensor 901 in order to detect jams of sheets fed from the sheet feed tray 135. The first stage sheet feed sensor 901 has a detection position immediately downstream of a first stage sheet feed roller 133 in a sheet feed direction, and can detect a front end and a rear end of a sheet fed from the sheet feed tray 135. The controller 100 acquires timing at which a front end of a sheet is detected or timing at which a rear end of a sheet is detected by monitoring a detection signal of the first stage sheet feed sensor 901.

Further, the image forming device 1 includes a timing sensor (or a timing detector) 902 that has a detection position immediately upstream of the timing roller 132 in the conveyance direction of sheets. The timing sensor 902 detects a front end and a rear end of a sheet at the detection position. The controller 100 acquires a timing at which the timing sensor 902 detects a front end and a rear end of a sheet.

For example, the controller 100 determines that a jam has occurred if the timing sensor 902 does not detect a front end of a sheet by the time a defined time has elapsed from the first stage sheet feed sensor 901 detecting the front end of the sheet.

Figure 10:
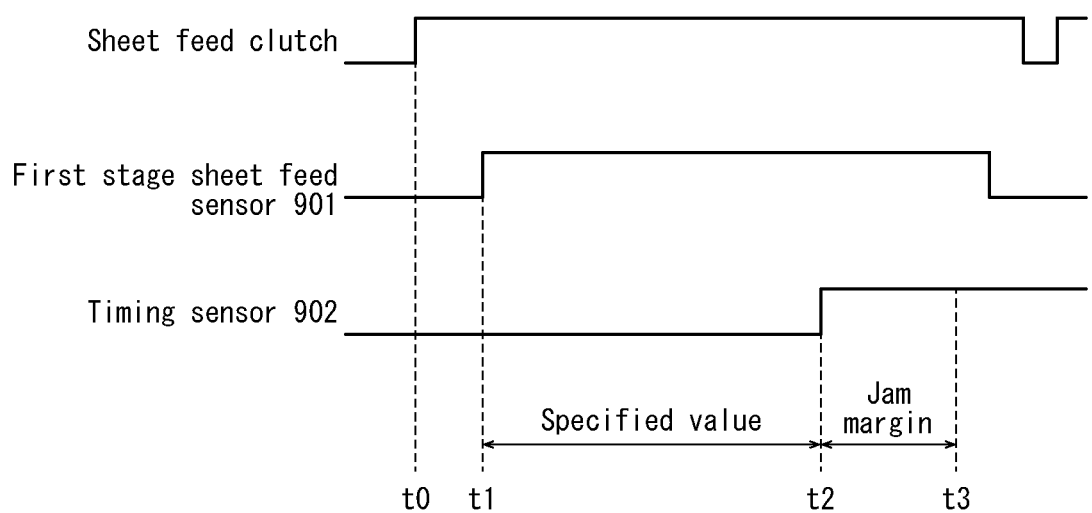
FIG. 10 is a timing chart illustrating a jam margin, which is a condition for detecting indication of a jam, according to operation timing of a sheet feed clutch, a first stage sheet feed sensor 901, and a timing sensor 902.

More specifically, as illustrated in FIG. 10, when a time t0 is when a sheet feed clutch (not illustrated) for transmitting and disconnecting transmission of rotational force from a drive source (not illustrated) to the first stage sheet feed roller 133 is connected, the first stage sheet feed roller 133 feeds a sheet from the sheet feed tray 135.

When a front end of a sheet that is fed out reaches the detection position of the first stage sheet feed sensor 901 at time t1, the first stage sheet feed sensor 901 detects the front end, and the controller 100 acquires the detection timing.

When the sheet is further conveyed and its front end reaches the detection position of the timing sensor 902, a detection signal indicating this is output by the timing sensor 902 and the controller 100 acquires the timing.

When the sheet is normally transported, the timing sensor 902 detects the front end of the sheet at time t2. The time t2 is a time obtained by adding a time (specified value) elapsed to the time t1, where the specified value is obtained by dividing a distance on the conveyance path of the sheet from the detection position of the first stage sheet feed sensor 901 to the detection position of the timing sensor 902 by the sheet conveyance speed.

When a sheet type set by a user is different from a sheet type of a sheet fed out from the sheet feed tray 135, there is a risk that the sheet is not conveyed normally and a front end of the sheet reaches the detection position of the timing sensor 902 later than the specified value indicates. That is, even if the timing at which the front end of the sheet arrives is delayed, there is a case where a jam does not occur and image forming processing can be executed.

In this way, when image forming processing can be executed but it is determined that a jam has occurred, image forming processing would be stopped and a user unnecessarily instructed to perform jam processing, which would decrease convenience of the image forming device 1. Therefore, according to the image forming device 1, a jam is judged to have occurred when the timing sensor 902 does not detect a front end of a sheet even at a time t3 after a defined jam margin has elapsed in addition to the specified value from the time t1.

If the timing sensor 902 detects a front end of a sheet during this jam margin, it does not mean that a jam has occurred, but it is an indication that a jam may occur, and therefore it can be estimated that sheet type specified by a user is different from sheet type of a sheet being fed out. Focusing on this, according to the present embodiment, if the timing sensor 902 detects a front end of a sheet during the jam margin, it is determined that sheet type specified by a user is not correct, and sheet type setting mode is switched from the user specified mode to the automatic discrimination mode.

Similarly, when feeding sheets from the manual sheet feed tray 121, if elapsed time from detection of a front end of a sheet by the manual sheet feed tray 121 to detection of the front end of the sheet by the timing sensor 902 (sheet conveyance time) is longer than the specified value when a sheet is normally conveyed, and is within the range of the jam margin so that it is not long enough to determine that a jam has occurred, then sheet type setting mode is switched from the user specified mode to the automatic discrimination mode.

Similarly, when a second stage sheet feed tray, a third stage sheet feed tray, and a fourth stage sheet feed tray are provided below the sheet feed tray 135, a second stage sheet feed sensor, a third stage sheet feed sensor, and a fourth stage sheet feed sensor may be provided, and if sheet conveyance time from detection of a front end of a sheet by a sheet feed sensor to detection of the front end of the sheet by the timing sensor 902 is within a defined jam margin, then sheet type setting mode is switched.

Similarly, when a large capacity tray (LCT) is added to the image forming device 1, if a sheet conveyance time from a front end of a sheet being detected by an LCT sheet feed sensor to the front end of the sheet being detected by the timing sensor 902 is within a defined jam margin, then sheet type setting mode may be switched.

(2-2) Operation of Image Forming Device 1

The following describes operation of the image forming device 1.

Figure 11:
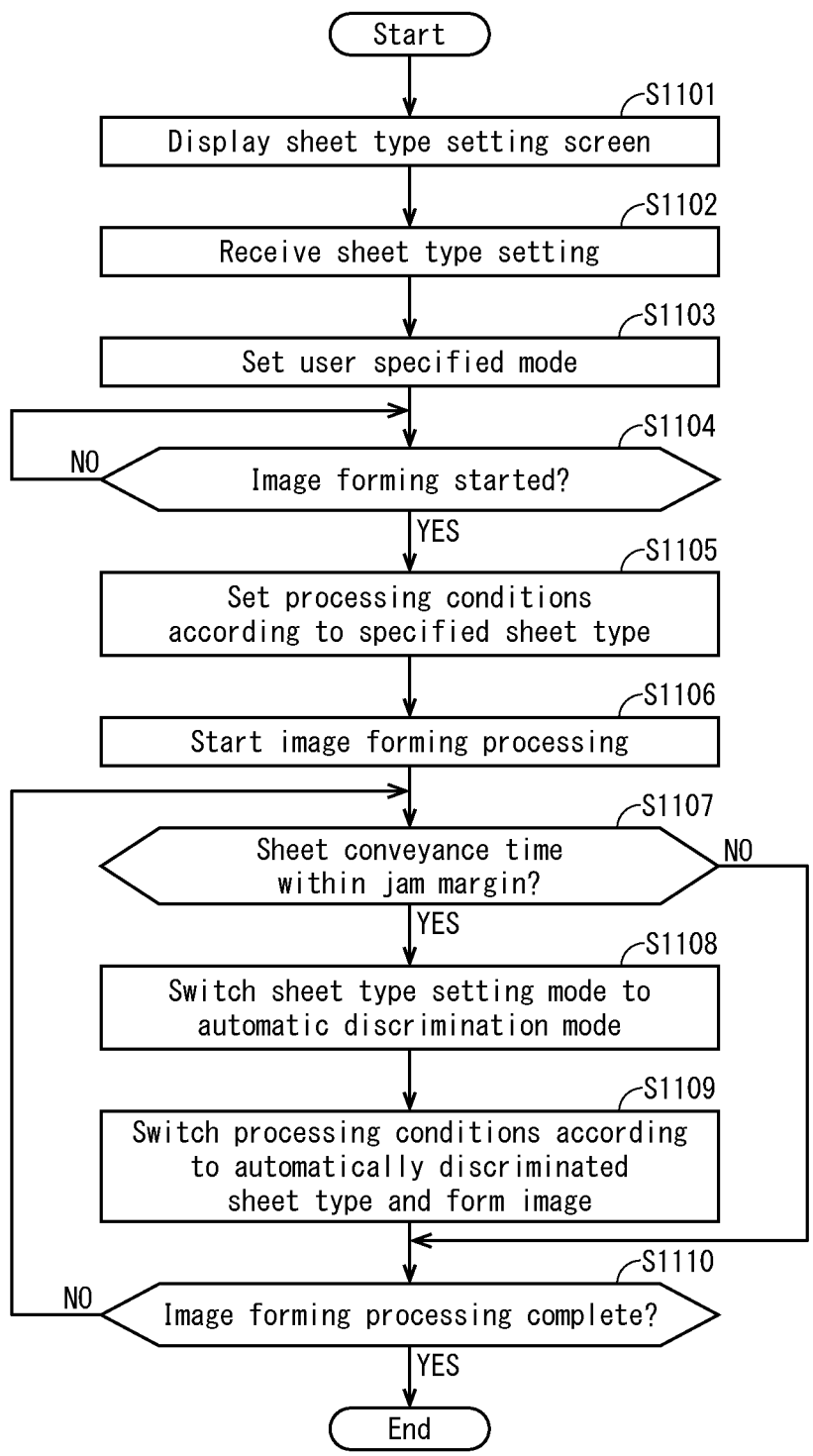
FIG. 11 is a flowchart illustrating an operation in which image forming device 1 according to Embodiment 2 detects indication of a jam and switches a sheet type setting mode.

As illustrated in FIG. 11, after the image forming device 1 receives a sheet type specification from a user and switches sheet type setting mode to the user specified mode (S1101 to S1103) and receives an image forming processing start instruction from a user ("YES" in S1104), processing conditions are set according to sheet type specified by the user (S1105), and image forming processing is started (S1106).

In image forming processing, when sheet feeding is executed, if sheet conveyance time from a sheet feed sensor detecting a front end of a sheet to the timing sensor 902 detecting the front end of the sheet is within the jam margin ("YES" in S1107), then the sheet type setting mode is switched from the user specified mode to the automatic discrimination mode (S1108), and image forming processing is executed under processing conditions according to sheet type automatically discriminated using the media detection sensor 120 (S1109).

In order to set processing conditions in this way, the image forming device 1 discriminates sheet type by using the media detection sensor 120 even if sheet type setting mode is the user specified mode.

If the sheet conveyance time has reached the specified value ("NO" in S1107), and if image forming processing has not been completed after the processing of step S1109 ("NO" in S1110), processing proceeds to step S1107 and the processing described above is repeated. When image forming processing is complete ("YES" in S1110), this processing is completed.

If sheet conveyance is repeated and sheet conveyance time starts falling within the jam margin, the sheet type set by a user may be incorrect, but according to the above an indication of a jam is detected and therefore it is judged whether or not sheet type of a sheet actually being fed out is the same the sheet type specified by a user, and if sheet type is different, the mode is switched the automatic discrimination mode and sheet type is automatically discriminated. Therefore, even if a user of the image forming device 1 is not familiar with sheet type settings, it is possible to form an image of excellent quality without bothering the user.

Further, if the image forming device 1 does not include the media detection sensor 120 and sheet type cannot be discriminated by the automatic discrimination mode, then it can still be determined whether a sheet type set by a user is a sheet type actually fed out, and a switch of sheet type setting mode can be made.

Embodiment 3

According to Embodiment 2, described above, whether or not sheet type is appropriately specified by a user is determined based on presence or absence of a sign indicating a jam may occur. However, according to the present embodiment, instead of a sign indicating a jam may occur, whether a user specified sheet type is appropriate is determined from a rate at which jams actually occur (jam occurrence rate).

Figure 12:
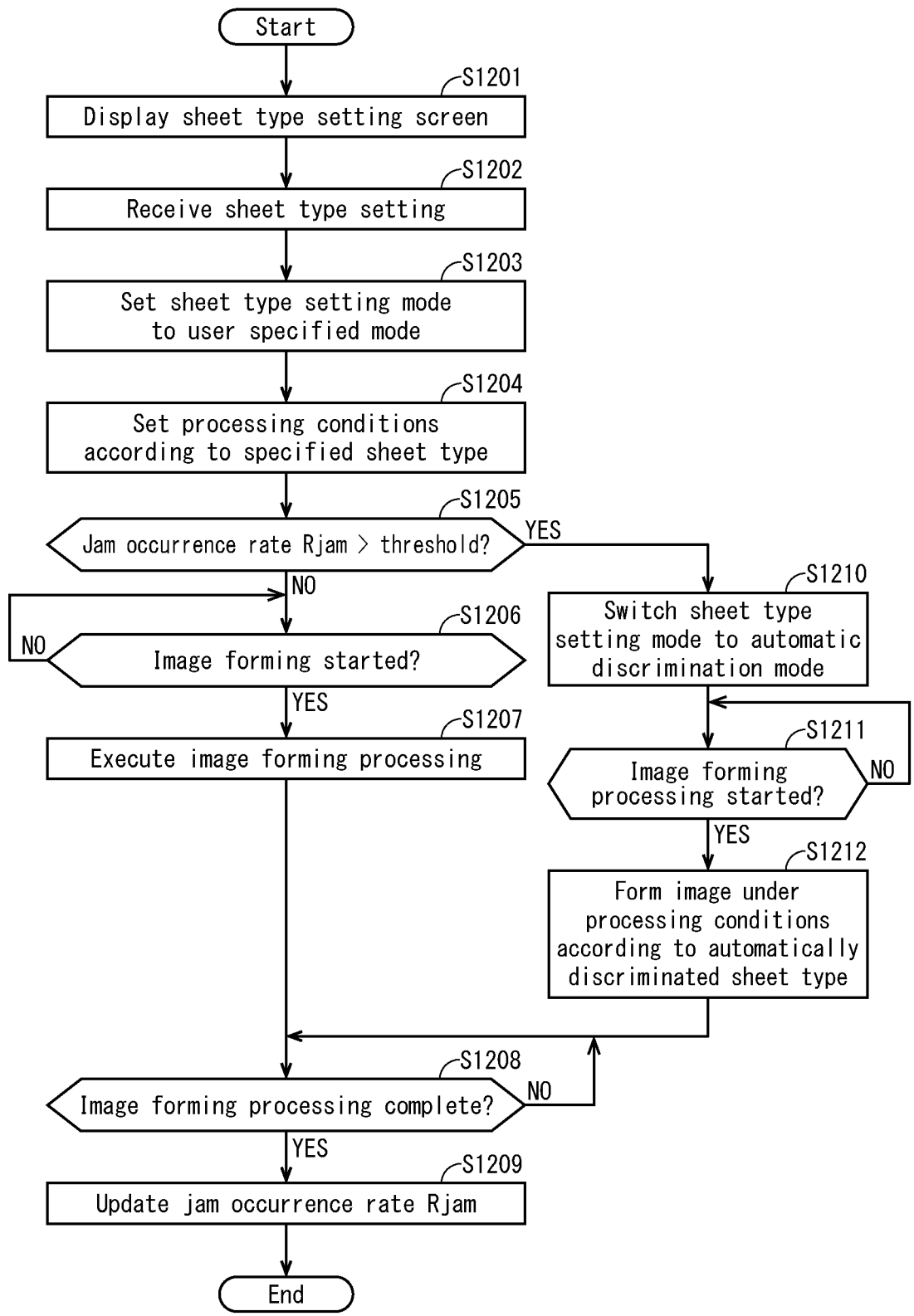
FIG. 12 is a flowchart illustrating an operation in which image forming device 1 according to Embodiment 3 switches a sheet type setting mode according to a high jam occurrence rate.

Therefore, as illustrated in FIG. 12, after receiving user specification of sheet type and setting processing conditions (S1201 to S1204), it is determined whether a jam occurrence rate Rjam when image forming processing of sheets of a sheet type specified by a user exceeds a defined threshold. As the jam occurrence rate Rjam, for example, a reciprocal of average jam interval (mean copies between jam (MCBJ)) can be used. The average jam interval is an average value of the number of sheets for which image forming is executed between occurrence of a jam and next occurrence of a jam. The longer the average jam interval, the lower the frequency of jams, and conversely, the shorter the average jam interval, the higher the frequency of jams.

Therefore, the larger the reciprocal of the average jam interval, the higher the jam occurrence rate, and the smaller the reciprocal of the average jam interval, the lower the jam occurrence rate. According to the present embodiment, when the reciprocal of the average jam interval is used as the jam occurrence rate Rjam, the reciprocal of 20,000 image forming sheets is used as the defined threshold. Of course, other values may be adopted as the defined threshold, and an appropriate value may be determined by conducting an experiment or the like.

If the jam occurrence rate Rjam is equal to or below the defined threshold when a sheet of a user specified sheet type is used in image forming processing ("NO" in S1205), it is estimated that the user specified sheet type is appropriate, and therefore sheet type setting mode is maintained as the user specified mode. Subsequently, when an instruction to start image forming processing is received from a user ("YES" in S1206), image formation processing is executed under the processing conditions according to sheet type specified by the user (S1207).

If the jam occurrence rate Rjam exceeds the defined threshold when a sheet of a user specified sheet type is used in image forming processing ("YES" in S1205), sheet type setting mode is switched from the user specified mode to the automatic discrimination mode (S1210). Subsequently, when an instruction to start image forming processing is received from a user ("YES" in S1211), image formation processing is executed under the processing conditions according to sheet type automatically discriminated (S1212).

Subsequently, when image forming processing is completed ("YES" in S1208), the jam occurrence rate Rjam is updated for the sheet type referred to when setting processing conditions for executing the image forming processing (S1209). When the reciprocal of the average jam interval is used as the jam occurrence rate Rjam, if a jam occurs during execution of the image forming processing, a cumulative count of sheets passing through until a jam occurs is recorded, then a new cumulative count of sheets is counted starting from 0. If no jam occurs, the number of sheets passing through in the image forming processing is added to the cumulative count of sheets passing through.

In addition to determining whether or not sheet type set by a user is appropriate, the image forming device 1 calculates the jam occurrence rate for purposes such as estimating a state of deterioration of a sheet conveyance system. By utilizing such a jam occurrence rate, a new index value can be set, and it can be determined whether or not sheet type is appropriately set by a user and sheet type setting mode can be switched without generating a processing load for repeating such calculation. Therefore, processing conditions can be set appropriately, and therefore images of excellent quality can be formed according to the sheet type set.

Embodiment 4

According to Embodiment 3, described above, it is determined whether sheet type is appropriately set by a user by comparing jam occurrence rate with a defined threshold, but according to the present embodiment, instead of a fixed threshold, whether sheet type is appropriately set by a user is determined by comparing jam occurrence rates when sheet type setting mode is the automatic discrimination mode.

Figure 13:
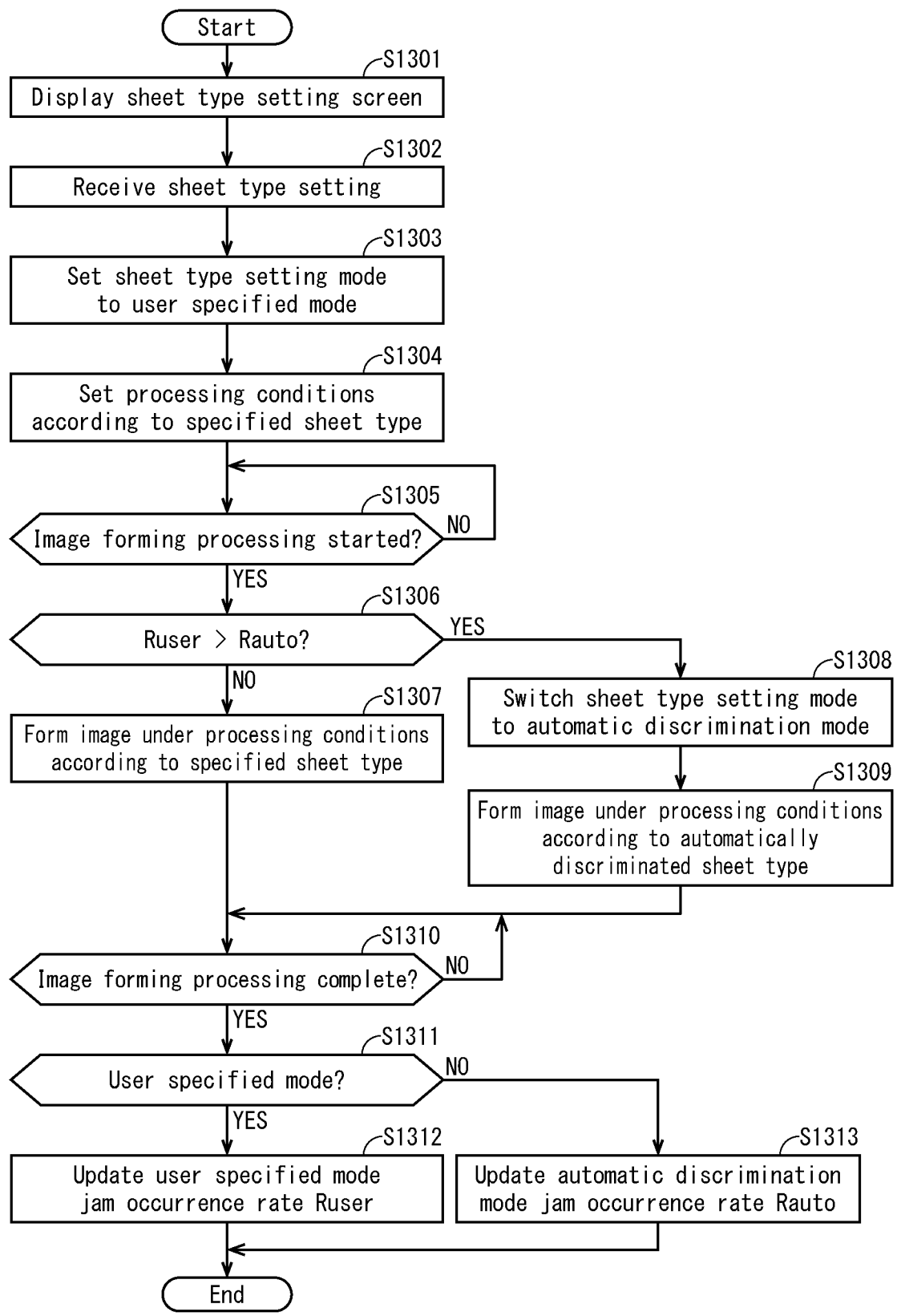
FIG. 13 is a flowchart illustrating an operation in which image forming device 1 according to Embodiment 4 switches a sheet type setting mode by comparing jam occurrence rates for each sheet type setting mode.

As illustrated in FIG. 13, after the image forming device 1 receives user specification of sheet type and sets processing conditions (S1301 to S1304), then receives an instruction to start image forming processing from a user ("YES" in S1305), first, a jam occurrence rate Ruser when sheet type setting mode is the user specified mode is compared to a jam occurrence rate Rauto when sheet type setting mode is the automatic discrimination mode.

According to the present embodiment, as in Embodiment 3, the jam occurrence rates Ruser, Rauto are the reciprocals of the average jam intervals when sheet type setting mode is the user specified mode and the automatic discrimination mode, respectively. Of course, index values other than the reciprocals of the average jam intervals may be used as the jam occurrence rates Ruser, Rauto.

As a result of this comparison, if the jam occurrence rate Ruser in the user specified mode is less than or equal to the jam occurrence rate Rauto in the automatic discrimination mode ("NO" in S1306), the image forming processing is performed under the processing conditions according to the sheet type specified by the user (S1307).

On the other hand, if the jam occurrence rate Ruser in the user specified mode is higher than the jam occurrence rate Rauto in the automatic discrimination mode ("YES" in S1306), the sheet type setting mode is switched to the automatic discrimination mode (S1308), and the image forming processing is performed under the processing conditions according to the sheet type automatically discriminated in the sheet type setting mode (S1309).

Subsequently, when image forming processing is completed ("YES" in S1310), the current sheet type setting mode is checked. If the current sheet type setting mode is the user specified mode ("YES" in S1311), Ruser is updated (S1312). Specifically, if a jam occurs during execution of the image forming processing, a cumulative count of sheets passing through in the user specified mode until a jam occurs is recorded, then a new cumulative count of sheets is counted starting from 0. If no jam occurs, the number of sheets passing through in the image forming processing in the user specified mode is added to the cumulative count of sheets passing through. After step S1312 is completed, processing ends.

If the current sheet type setting mode is the automatic discrimination mode ("NO" in S1311), Rauto is updated (S1313). Specifically, if a jam occurs during execution of the image forming processing, a cumulative count of sheets passing through in the automatic discrimination mode until a jam occurs is recorded, then a new cumulative count of sheets is counted starting from 0. If no jam occurs, the count of sheets passing through in the image forming processing is added to the cumulative count of sheets passing through in the automatic discrimination mode. After step S1313 is completed, processing ends.

A period for a cumulative count of sheets passing through, in order to calculate jam occurrence, may be from the time when the device is shipped to the time of jam occurrence rate calculation, or may be from the time of jam occurrence rate calculation for a defined period of time. The defined period of time may be set for the image forming device 1 at the time of product shipment, or may be set by an administrator of the image forming device 1.

The jam occurrence rate may be affected by conditions other than sheet type setting mode, such as deterioration of the image forming device 1 over time. If the influence of conditions other than sheet setting mode is the same, regardless of whether sheet type setting mode is the user specified made or the automatic discrimination mode, then the jam occurrence rate Ruser when sheet type setting mode is the user specified mode can be compared to the jam occurrence rate Rauto when sheet type setting mode the automatic discrimination mode, the influence of conditions other than sheet setting mode can be cancelled out, and a comparison of only a difference in jam occurrence rate due to sheet type setting mode can be made.

As described above, an index value other than the reciprocal of average jam interval may be used as the jam occurrence rate. In the table of FIG. 14, when sheet type setting mode is the automatic discrimination mode, the cumulative count of sheets passing through is 50,000 and the number of jams is 20, and therefore the jam occurrence rate Rauto is calculated to be 0.04%. On the other hand, when sheet type setting mode is the user specified mode, the cumulative count of sheets passing through is 45,000 and the number of jams is 60, and therefore the jam occurrence rate Ruser is 0.13%.

Accordingly, in this example, the jam occurrence rate Ruser in the user specified mode is greater than the jam occurrence rate Rauto in the automatic discrimination mode, and therefore image forming processing may be executed under processing conditions according to the automatic discrimination mode.

An example of a reason why the jam occurrence rate Ruser in the user specified mode is greater than the jam occurrence rate Rauto in the automatic discrimination mode is that a user of the image forming device 1 mistakenly set sheet type of sheets stored in the sheet feed tray 135, and image forming processing continued with the user setting. If thick paper is stored in the sheet feed tray 135 even though it is specified as plain paper by a user, the thick paper is conveyed at high speed, i.e., plain paper sheet conveyance speed (category 1 in the example of FIG. 7C) instead of at low speed, i.e., an appropriate sheet conveyance speed (category 2 in the example of FIG. 7C), and therefore transportability is reduced. In such a case, the jam occurrence rate Ruser in the user specified mode is high, and therefore it is effective to switch sheet type setting mode from the user specified mode to the automatic discrimination mode, as in Embodiment 4.

Embodiment 5

Figure 15:
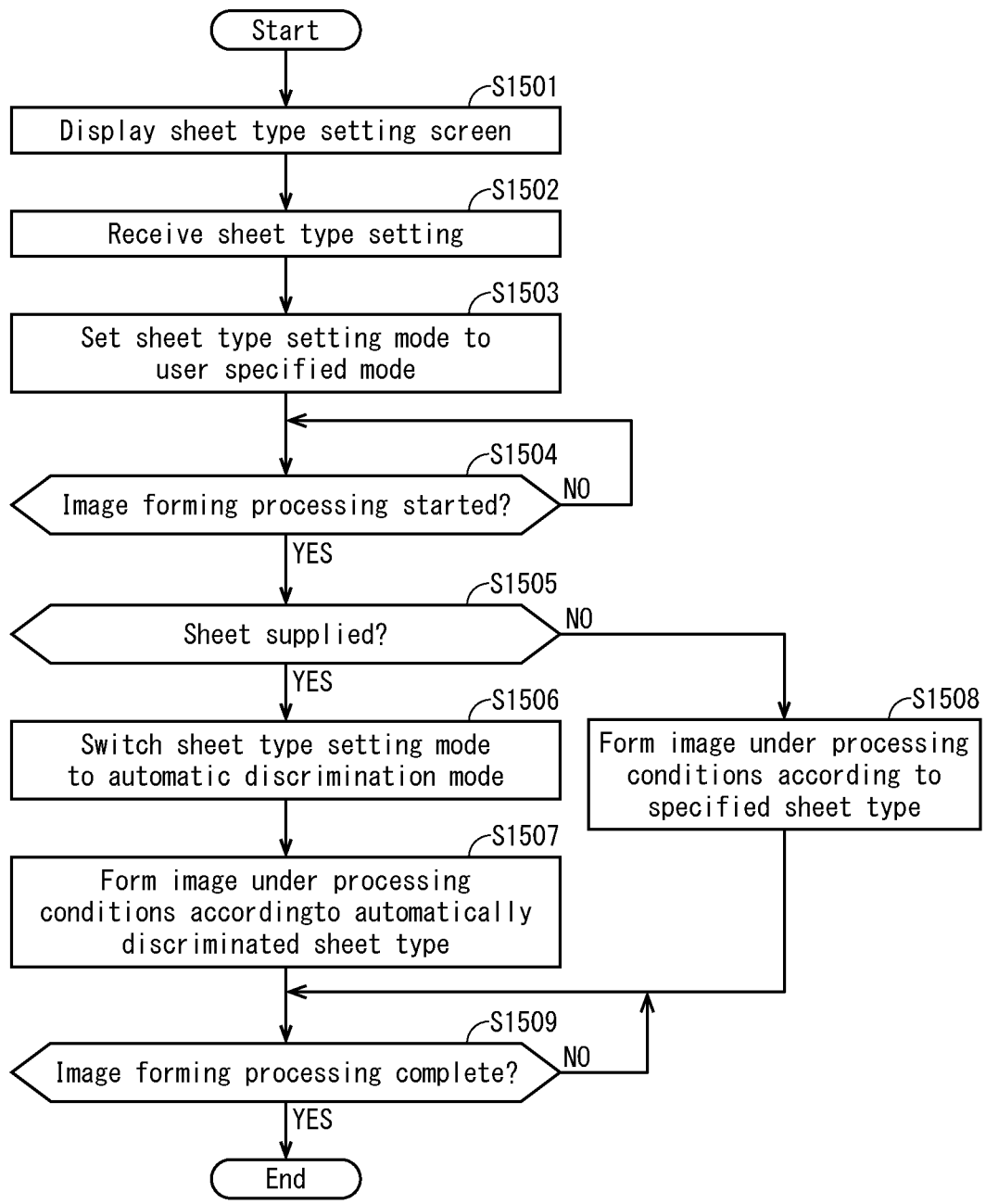
FIG. 15 is a flowchart illustrating an operation in which image forming device 1 according to Embodiment 5 switches a sheet type setting mode by detecting that a sheet has been added to sheet feed tray 135.

When new sheets are added and sheet type of the newly added sheets are set by a user while other sheets are already present in the sheet feed tray 135 of the image forming device 1, then when the sheet type of the sheets already present is different from sheet type of the sheets newly added, there is a risk of processing conditions being inappropriate when the already present sheets are used in image forming processing. For this reason, it is effective to execute processing as illustrated in FIG. 15.

First, after receiving user specification of sheet type and setting sheet type setting mode to the user specified mode (S1501 to S1503), and receiving an image forming processing start instruction from a user ("YES" in S1504), the image forming device 1 checks whether a sheet has been added to the sheet feed tray 135.

Figure 16:
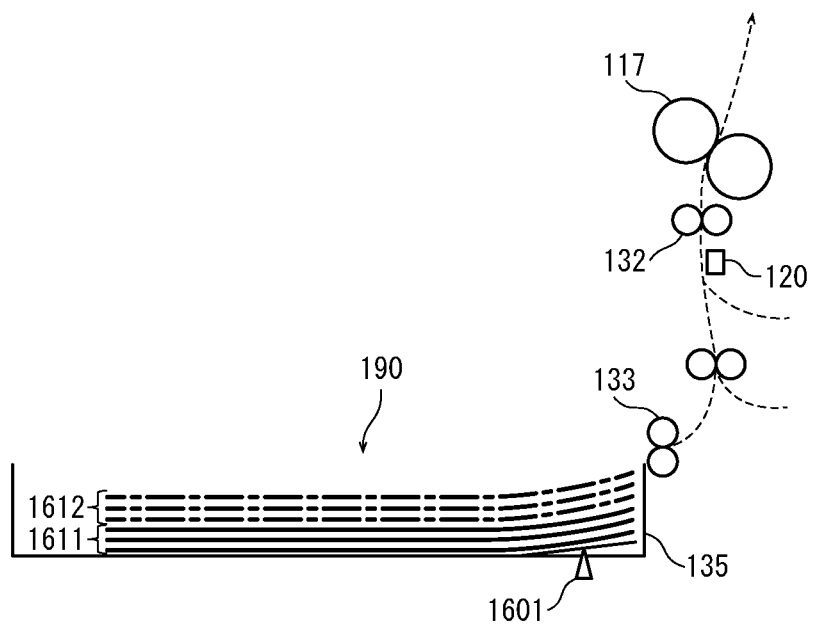
FIG. 16 is a diagram illustrating structure of image forming device for detecting that a sheet has been added to sheet feed tray 135.

As illustrated in FIG. 16, the image forming device 1 includes a sheet sensor 1601 that detects whether or not a sheet is housed in the sheet feed tray 135. The sheet sensor 1601 is, for example, a switch that is pushed down by weight of a sheet when a sheet is housed in the sheet feed tray 135 to switch between on and off states, and a piezoelectric element or the like can be used for this purpose. Further, the image forming device 1 includes an open/closed sensor (not illustrated) for detecting opening/closing of the sheet feed tray 135.

In the image forming device 1, while the sheet sensor 1601 is detecting a sheet and the sheet feed tray 135 is pulled out from the image forming device 1, then new sheets are added, then the sheet feed tray 135 is pushed into the image forming device 1, the open/closed sensor detects a state that a sheet for use in image forming processing can be fed out, and it can be determined that a sheet may have been added to the sheet feed tray 135.

When the image forming device 1 determines that a sheet has been added to the sheet feed tray 135 ("YES" in S1505), the sheet type setting mode is switched from the user-specified mode to the automatic discrimination mode (S1506), and image forming processing is executed under processing conditions according to the automatically discriminated sheet type (S1507).

In this way, in the automatic discrimination mode, sheet type is automatically discriminated using the media detection sensor 120, and processing conditions are set, and therefore even if newly added sheets in the sheet feed tray 135 are used up and sheets that remain in the sheet feed tray 135 are used in image forming processing, processing conditions can be set appropriately. Therefore, even if sheets of different sheet types are mixed in the sheet feed tray 135 due to addition of sheets into the sheet feed tray 135, images of excellent quality can be formed regardless of sheet type.

Further, it is possible to prevent a sheet conveyance defect such as a jam from occurring due to improper setting of sheet type during execution of image forming processing. Further, sheet type setting mode is automatically switched without troubling a user of the image forming device 1, and therefore it is possible to prevent an issue caused by addition of sheets without decreasing convenience.

The same effect can be achieved when a sheet is added to the manual sheet feed tray 121 by applying the present embodiment. This is also true when the sheet feed tray has a multi-stage configuration or when a large capacity tray is used.

Embodiment 6

According to Embodiment 5, a case is described where sheets of different sheet types are mixed in a sheet feed tray due to the addition of new sheets, but even when all the sheets in a sheet feed tray are used up, a large capacity sheet feed tray can house multiple bundles of sheets (for example, where a bundle is 500 sheets), and therefore it is possible that among only newly added sheets, different sheet types may be accidentally added to the sheet feed tray. In such a case, sheet type can be set appropriately by the following configuration.

As illustrated in FIG. 17, after the image forming device 1 receives sheet type setting from a user, sets sheet type setting mode to the user specified mode, and starts image forming processing under the processing conditions corresponding to the specified sheet type (S1701 to S1704), the media detection sensor 120 is used to discriminate sheet type of fed out sheets (S1705).

When sheets of different sheet types are stored in the sheet feed tray 135, then even if the automatically discriminated sheet type and user specified sheet type match at the start of image forming processing, sheet type fed out from the sheet feed tray 135 can change as image forming processing proceeds, leading to the automatically discriminated sheet type and the user specified sheet type no longer matching. Further, if user specification is incorrect to start with, the automatically discriminated sheet type and the user specified sheet type do not match from the beginning of image forming processing.

When the automatically discriminated sheet type does not match the user specified sheet type ("NO" in S1706), image forming processing is temporarily suspended (S1707), and the user asked whether sheet type setting mode is to be switched to the automatic discrimination mode (S1708). For example, the speaker 505 outputs a warning sound to gain a user's attention, and a confirmation message is displayed on the operation panel 410 to the user to select and input whether or not to switch sheet type setting mode.

FIG. 18A illustrates a display for user confirmation of whether or not to switch sheet type setting mode to the automatic discrimination mode by using the operation panel 410. In this display example 1800, a message "sheet type setting mode is currently set manually. Return to automatic setting?" along with a "YES" button 1801 and a "NO" button 1802 are displayed on a display of the sheet type setting screen 600 on the touch panel 500 of the operation panel 410.

When a user presses the "YES" button 1801, sheet type setting mode is switched to the automatic discrimination mode. When the "NO" button 1802 is pressed, sheet type setting mode remains in the user specified mode. When the "NO" button 1802 is pressed, only the message is deleted, the sheet type setting screen 600 is displayed, and sheet type setting may be received from the user. In this way, when a user wants to set sheet type, the hassle of switching to the sheet type setting screen is eliminated, which improves convenience for the user.

In the display example 1810 of FIG. 18B, in addition to the same display as that of FIG. 18A, a message "do not display this message in future" and a checkbox 1813 are displayed. If the "YES" button 1811 or the "NO" button 1812 is pressed while the checkbox 1813 is checked, sheet type setting mode is set to a setting mode corresponding to the pressed button, and the setting mode is stored. In next and subsequent image forming processing, even if an automatically discriminated sheet type does not match a user specified sheet type, the confirmation screen is not displayed, and sheet type setting mode is set to the stored setting mode.

FIG. 18C illustrates a display example in which sheet type setting mode is forcibly switched to the automatic discrimination mode regardless of user intent, without executing the conditional branching of step S1709. In this case, only a notification of switching to the automatic discrimination mode is displayed.

These confirmation and displays may also be executed for other embodiments when sheet type setting mode is to be switched. Further, an administrator of the image forming device 1 may set whether or not to confirm with a user whether or not to switch sheet type setting mode.

If a user approves switching of sheet type setting mode, or sheet type setting mode is forcibly switched ("YES" in S1709), the sheet type setting mode is switched to the automatic discrimination mode (S1710), image forming processing conditions are changed according to the automatically discriminated sheet type (S1711), and image forming processing is resumed (S1712).

If sheet type setting mode is not switched ("NO" in S1709), image forming processing is resumed as is (S1712) Further, if the automatically discriminated sheet type matches the user specified sheet type ("YES" in S1706), image forming processing continues as is.

Even in the latter case, a user of the image forming device 1 can find out that sheet type setting mode being set inappropriately is a reason why image quality may be insufficiently high, and even without learning how to set sheet type appropriately, can see that it suffices to set sheet type setting mode to the automatic discrimination mode, and therefore user convenience is increased, and images of excellent quality can be formed.

Embodiment 7

According to Embodiment 6, whether or not to switch sheet type setting mode is determined depending on whether or not the user specified sheet type and the automatically discriminated sheet type match, but as described above in reference to FIGS. 7A, 7B, 7C, if processing conditions are the same even when sheet types are different, an image of excellent quality may be formed even under processing conditions of a sheet type specified by a user. Further, when processing conditions do not match between the user specified sheet type and the automatically discriminated sheet type, image quality might not deteriorate so much even if image forming processing is executed under processing conditions according to the user specified sheet type.

Figure 19:
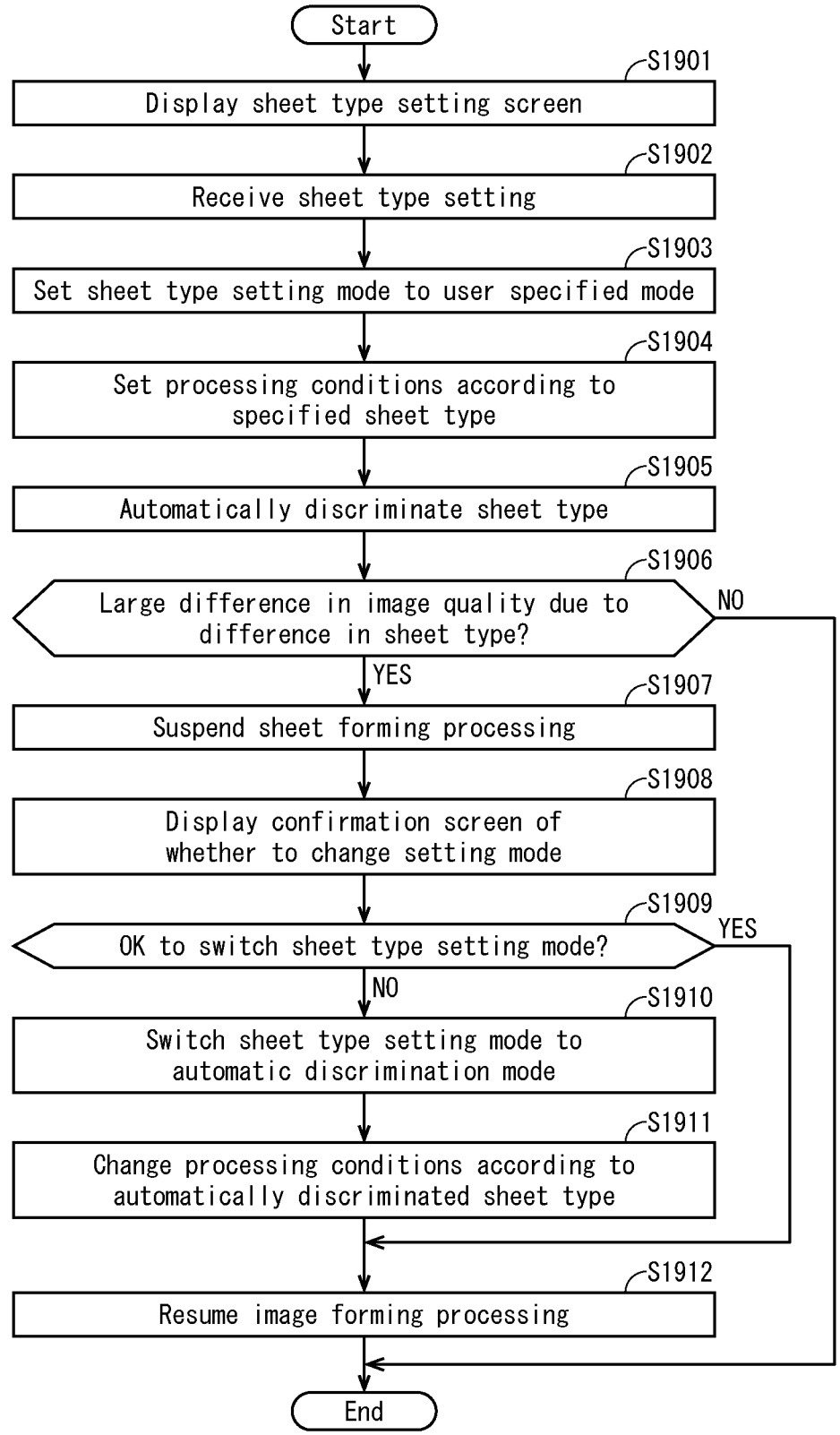
FIG. 19 is a flowchart illustrating an operation in which image forming device 1 according to Embodiment 7 switches sheet type detection mode according to whether or not automatically discriminated sheet type matches sheet type specified by a user.

In such a case, instead of step S1706 in FIG. 17, as shown in step S1906 in FIG. 19, even if the automatically discriminated sheet type and the user specified sheet type are different, if the differences in processing conditions corresponding to the sheet types are small, and therefore the difference in image quality is small regardless of which processing conditions are used for image forming ("NO" in S1906), image forming processing is continued without switching sheet type setting mode.

Of course, if the automatically discriminated sheet type and the user specified sheet type match, there can be no difference in image quality, and therefore image forming processing is continued as is.

On the other hand, if there is a large difference in image quality due to a difference between the automatically discriminated sheet type and the user specified sheet type, or in other words if image quality would be greatly improved by executing image forming processing under processing conditions according the automatically discriminated sheet type instead of the user specified sheet type ("YES" in S1906), image forming processing is temporarily interrupted, and after user confirmation, sheet type setting mode is set to the automatic discrimination mode, and image forming processing is resumed (S1907 to S1912).

Further, it is also possible to display the display example illustrated in FIG. 18C, and without waiting for user confirmation, switch sheet type setting mode from user specified to automatic discrimination, and resume image forming processing.

When it is determined by comparing the user specified sheet type and the automatically specified sheet type that even if image forming processing is continued under processing conditions according to the user specified sheet type, image quality is at a level where there is no practical problem, excellent image quality can be maintained while also avoiding a decrease in productivity due to interruption of image forming processing (S1907).

According to the present embodiment, for each of secondary transfer voltage, fixing temperature, and sheet conveyance speed, when a category of an automatically discriminated sheet type and a category of a user specified sheet type do not match, in step S1906 it is determined that a difference in image quality due to the difference in sheet type is large ("YES" in S1906).

On the other hand, if categories for the automatically discriminated sheet type and the user specified sheet type match for all of secondary transfer voltage, fixing temperature, and sheet conveyance speed, then in step S1906, it is determined that a difference in image quality due to the difference in sheet type is not large ("NO" in S1906).

Of course, the determination of step S1906 may be made by other methods, such as determining magnitude of a difference in image quality caused by a difference in sheet type based on whether a basis weight of a sheet of an automatically discriminated sheet type is within a range from a basis weight of a user specified sheet type.

Embodiment 8

Although not specifically mentioned in the preceding embodiments, many image forming devices distinguish between user privileges and administrator privileges in use. In such a case, even if sheet type is set by a user, when sheet type has a default setting made by an administrator, the default set sheet type may be prioritized. In this way, image quality is not guaranteed for sheet types other than the default set sheet type, and users may become reluctant to use it. Therefore, an administrator can limit sheet types that a user can use for image forming processing, for the purpose of cost reduction and the like.

Further, it is possible to specify enabling or disabling of automatic discrimination mode with administrator privileges. Even if the automatic discrimination mode is disabled and sheet type setting mode is set to the user specified mode by a user, the image forming device 1 may switch sheet type setting mode to the automatic discrimination mode when taking into consideration various conditions as described above.

On the other hand, when the automatic discrimination mode is enabled by an administrator, then even if a user specifies sheet type on the sheet type setting screen 600, the setting by the administrator has priority and sheet type setting mode is set to the automatic discrimination mode.

On the contrary, when the automatic discrimination mode is disabled by an administrator, then even if a user enables the automatic discrimination mode on the sheet type setting screen 600, the setting by the administrator has priority and sheet type setting mode is set to the user specified mode. Unless a user specifies a particular sheet type, image forming processing is executed under processing conditions according to a sheet type set as default by an administrator.

Embodiment 9

According to at least one embodiment, the media detection sensor 120 is used to estimate basis weight of a sheet, and a table illustrated in FIG. 3 is referenced to specify a sheet type corresponding to the basis weight. However, there may be cases where basis weight of a sheet estimated using the media detection sensor 120 does not correspond to any sheet type. A cause of this may be that the sheet does not correspond to sheet types in the specifications of the image forming device 1, or that estimation is incorrect due to a defect of the media detection sensor 120, or the like.

If a transmitted light amount or reflected light amount detected by the media detection sensor 120 is not stable, light amount emitted by the LED 232, 233, 242 may be unstable, or light amounts detected by the photodiode 243 may be unstable, and therefore it is suspected that estimation of basis weight is incorrect. Further, if a normal value cannot be detected in calibration of the media detection sensor 120, it is suspected that the media detection sensor 120 is malfunctioning.

In such a case, if sheet type setting mode is maintained in the automatic discrimination mode, processing conditions cannot be set properly and image quality may deteriorate, and therefore sheet type setting mode may be switched to the user specified mode.

That is, as a means for determining whether or not sheet type can be normally determined using the media detection sensor 120, sensors are arranged for detecting failures of the LED 232, 233, 242 and the photodiode 243, and if the sensors determine that sheet type cannot be normally determined using the media detection sensor 120, sheet type setting mode can be switched from the automatic determination mode to the user specified mode.

Further, when switching sheet type setting mode, for ease of use of novice users who are not familiar with the image forming device 1, the sheet type setting screen 600 may be automatically displayed on the operation panel 410, along with a dialog box superimposed thereon indicating that there is a possibility sheet type is not being correctly automatically discriminated, and therefore user specification is requested.

In this way, regardless of whether sheet type setting mode is set to the automatic discrimination mode, it can be difficult for a user of the image forming device 1 to judge whether or not sheet type is being correctly automatically discriminated, and therefore also difficult for a user of the image forming device 1 to correct deterioration of image quality due to such a state.

On the other hand, according to the present embodiment, such a state is automatically determined, and sheet type setting mode switched to the user specified mode, and therefore images of excellent quality can be formed by setting processing conditions according to the user specified sheet type.

Embodiment 10

Figure 20:
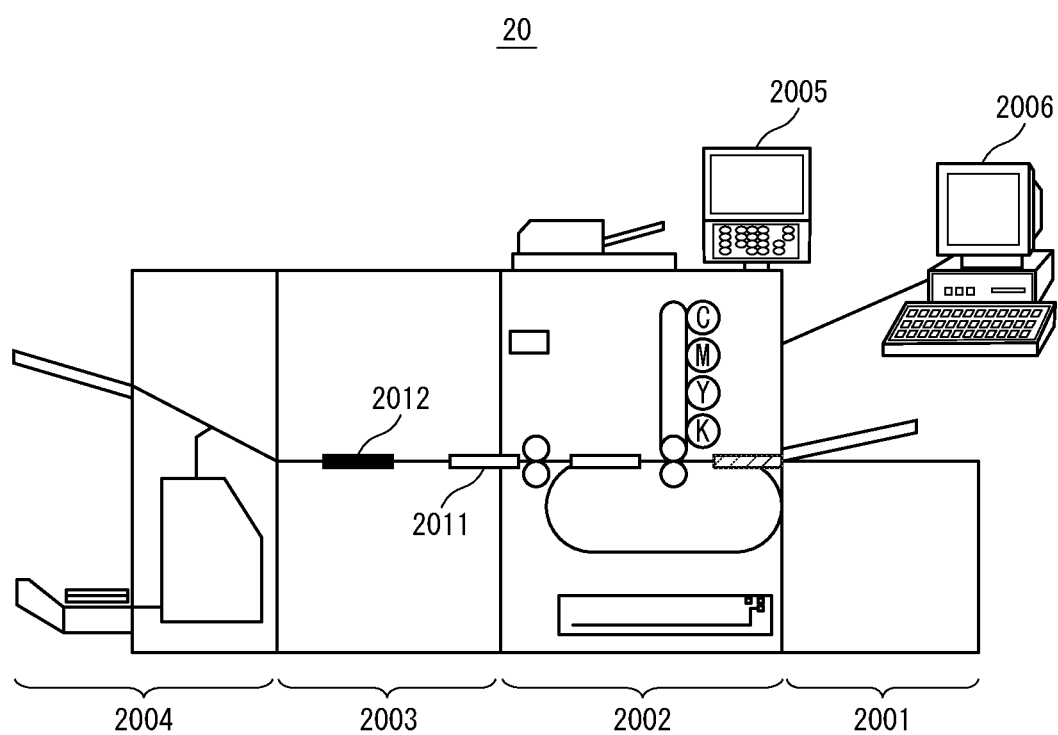
FIG. 20 is a diagram illustrating main structure of production printing machine 20 according to Embodiment 10.

As illustrated in FIG. 20, a production printing machine 20 used for digital printing and the like includes a large capacity tray 2001 capable of housing a large number of sheets, an image former (or an image forming device) 2002, an image reader 2003, and a post-processing unit 2004. The image former 2002 executes image forming processing due to reception of an image forming job according to a user operation via an operation panel 2005, reception of an image forming job from an external device 2006 such as a personal computer (PC), or the like.

Image quality of an image formed on a sheet ejected from the image former 2002 is inspected by the image reader 2003. The image reader 2003 includes image reading units 2011, 2012 that are image calibration control units (ICCU), for example contact image sensors (CIS) or the like, and can read both sides of a sheet ejected from the image former 2002.

The image reader 2003 refers to a read image and inspects whether an image is formed correctly. This inspection is performed, for example, by determining presence or absence of stains, unevenness, marks, blurring, etc., of an image formed by image processing.

When it is confirmed that an image is correctly formed on a sheet, the sheet is conveyed to the post-processing unit 2004, where a binding processing specified by the image forming job is applied, such as stapling or punching. When it is confirmed that an image is not correctly formed on a sheet, the sheet is stored in a storage unit (not illustrated), and is not conveyed to the post-processing unit 2004. Further, the image reader 2003 notifies the image former 2002 that the image is not formed correctly.

When the image former 2002 is notified that the image is not formed correctly, there is a possibility that images are not being formed correctly on all sheets being conveyed at the time the notification is received, and therefore the sheets are not conveyed to the image reader 2003 and are ejected outside the machine. Subsequently, the image former 2002 switches sheet type setting mode. That is, when a current setting mode is the user specified mode, it is determined that the sheet type specified by a user is incorrect, and the setting mode is switched to the automatic discrimination mode.

Conversely, when a current setting mode is the automatic discrimination mode, it is determined that sheet type cannot be automatically discriminated correctly, and the setting mode is switched to the user specified mode. After switching sheet type setting mode, the image former 2002 re-executes the image forming processing from the page for which the image reader 2003 determined that an image was not formed correctly.

In this way, it is possible to determine whether or not sheet type is properly set by actually inspecting an image itself formed on a sheet, and therefore sheet type setting mode can be switched and appropriate sheet type setting can be prompted.

Modifications

Although the present disclosure has provided description of the embodiments above, the present disclosure is of course not limited to the embodiments described above, and the following modifications can be implemented.

(11-1) According to Embodiment 1, sheet type setting mode switches from the user specified mode to the automatic discrimination mode by using an auto-reset function, but the present disclosure is of course not limited to this example, and the following modification may be used instead. That is, instead of switching sheet type setting mode to the automatic discrimination mode (S808 in FIG. 8), when the time-up occurs ("YES" in S807 in FIG. 8), sheet type may be switched to a default setting while maintaining the user specified mode.

This default setting may be set at a time of shipment of the image forming device 1, or may be set by an administrator of the image forming device 1. In particular, this modification is effective when a sheet type outside the specifications of the image forming device 1 is frequently used in image forming processing, and even if sheet type setting mode is switched from the user specified mode to the automatic discrimination mode, sheet type would be difficult to automatically discriminate.

(11-2) According to at least one embodiment, basis weight as a property of a sheet is detected by detecting transmittance of infrared light IR and blue light B and reflectance of green light G using the media detection sensor 120, but the present disclosure is of course not limited to this example, and other types of sensor may be used as the media detection sensor 120. For example, a property for discriminating sheet type can be obtained by irradiating a sheet with ultrasound waves and detecting an attenuation rate of intensity.

(11-3) According to at least one embodiment, an indication is displayed on the operation panel 410 when sheet type setting mode is switched, but the present disclosure is of course not limited to this, and the following alternative or additional methods may be used. For example, a screen for displaying a message indicating a switch of sheet type setting mode does not have to be the sheet type setting screen 600, and the message may be displayed on any screen displayed on the touch panel 500 of the operation panel 410.

Further, instead of or at the same time as displaying the message on the operation panel 410, the message may be output as audio. A user of the image forming device 1 might not notice a message displayed only on the operation panel 410. In contrast, if a message is output by audio, it becomes easier to call a user's attention than when only a screen display is executed.

Users of the image forming device 1 do not always pay attention to the touch panel 500 of the operation panel 410, and therefore particularly when confirmation input is sought, if a user does not notice a message, time and effort may be required to notice and realize why image forming processing has been interrupted. On the other hand, if a message is output by audio, a user can easily notice the message, which improves convenience for users.

(11-4) According to the embodiments above, conditions for determining whether to switch sheet type setting mode are different, but the present disclosure is not limited to the examples above, and the embodiments may be combined. That is, whether or not to switch sheet type setting mode may be determined according to a plurality of conditions. In such a case, sheet type setting mode may be switched when any one of the plurality of conditions is satisfied, or sheet type setting mode may be switched when the plurality of conditions are satisfied at the same time.

For example, sheet type setting mode may be switched only when automatically discriminated sheet type and user specified sheet type are different, and according to presence or absence of a jam indicator or in response to a high jam occurrence rate. Indication of a jam and high jam occurrence rates can occur in situations other than inappropriate sheet type setting, such as when a conveyance roller that conveys sheets is worn down. On the other hand, when an automatically discriminated sheet type and a user specified sheet type are different, the probability that jams occurred because of inappropriate sheet type setting is high.

Further, if no jams occur even if automatically discriminated sheet type and user specified sheet type are different, it may be considered that sheet type setting is not sufficiently inappropriate to require switching sheet type setting mode. Therefore, it is even more effective to switch sheet type setting mode only when both conditions are met, that is, if the automatically discriminated sheet type and the user specified sheet type do not match and jams are occurring.

By considering a plurality of conditions in this way, it is possible to switch sheet type setting mode appropriately according to various situations, and therefore processing conditions appropriate to a sheet can be set, and images of excellent image quality can be formed.

(11-5) Although not specifically mentioned regarding the embodiments above, switching sheet type setting mode from the user specified mode to the automatically discriminated mode may be prohibited under certain conditions.

For example, if jams do not occur in a sheet conveyance system, or in other words if a jam occurrence rate is lower than a defined threshold value, it can be estimated that a user specified sheet type is appropriate. Therefore, in such a case, it is possible to form an image of excellent quality without switching from the user specified mode to the automatic discrimination mode, and therefore it may be prohibited to switch sheet type setting mode to the automatic discrimination mode.

Further, when automatic discrimination mode is disabled by an administrator of the image forming device 1, it is of course prohibited to switch sheet type setting mode from the user specified mode to the automatic discrimination mode.

Further, if a user specified sheet type does not correspond to a sheet type that can be automatically discriminated using the media detection sensor 120, it cannot be determined whether or not the user specified sheet type is appropriate, and therefore sheet type setting mode may be prohibited from being switched from the user specified mode to the automatic discrimination mode.

(11-6) According to at least one embodiment, the image forming device is a tandem type of color printer, but the present disclosure is of course not limited to this, and similar effects can be achieved by applying the present disclosure to color printers and monochrome printers other than tandem types. Further, the present disclosure may be applied to a copier device in which a scanner is added to a printer, or a single function device such as a facsimile device that has a facsimile communication function, or to a multi-function peripheral (MFP) having such functions.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image forming device comprising:
a sheet feeder that feeds a sheet;
a controller that:
discriminates a sheet type of the sheet, and
receives a user input to specify a sheet type; and
an image forming device that has two setting modes including an automatic discrimination mode in which an image is formed based on the discriminated sheet type and a user specified mode in which an image is formed based on the sheet type specified by the user input, wherein
the controller automatically switches one of the two setting modes to the other based on one or more defined conditions,
the controller measures an elapsed time since a user operation is received,
the defined conditions include that the elapsed time reaches a defined time, and
upon determining that the elapsed time reaches the defined time, the controller switches the user specified mode to the automatic discrimination mode.

2. The image forming device of claim 1, wherein
the defined conditions include that when the image is being formed under the one of the two setting modes, a possibility that a sheet type setting is incorrect is higher than when the image is being formed under the other of the two setting modes.

3. The image forming device of claim 1, wherein
the controller issues a notification when switching the one of the two setting modes.

4. The image forming device of claim 3, wherein
the controller issues the notification by an operation panel.

5. The image forming device of claim 1, wherein
the controller switches the one of the two setting modes when the one of the two setting modes is the user specified mode.

6. The image forming device of claim 1, wherein
the controller switches the one of the two setting modes when the one of the two setting modes is the automatic discrimination mode.

7. The image forming device of claim 1, wherein
the controller uses a plurality of determination criteria as the defined conditions for switching the user specified mode to the automatic discrimination mode.

8. The image forming device of claim 1, further comprising:
an operation panel that has a reset key, wherein
the defined conditions include that the reset key is pressed, and
upon determining that the reset key is pressed, the controller switches the user specified mode to the automatic discrimination mode.

9. The image forming device of claim 1, further comprising:
a timing detector that detects a timing at which the sheet passes through a sheet conveyance path, wherein
the controller determines presence or absence of an indication of jam occurrence, depending on whether the timing detected by the timing detector is delayed within a defined range from a timing detected when the sheet is normally conveyed,
the defined conditions include that the controller determines the presence of the indication of jam occurrence, and
upon determining the presence of the indication of jam occurrence, the controller switches the user specified mode to the automatic discrimination mode.

10. The image forming device of claim 1, wherein
the controller acquires a jam occurrence rate for each sheet type,
the defined conditions include that the jam occurrence rate of the sheet type specified by the user input is higher than a defined threshold, and upon determining that the jam occurrence rate is higher than the defined threshold, the controller switches the user specified mode to the automatic discrimination mode.

11. The image forming device of claim 1, wherein
the controller acquires a jam occurrence rate for each of the two setting modes,
the defined conditions include that the jam occurrence rate in the user specified mode is higher than the jam occurrence rate in the automatic discrimination mode, and
upon determining that the jam occurrence rate in the user specified mode is higher than the jam occurrence rate in the automatic discrimination mode, the controller switches the user specified mode to the automatic discrimination mode.

12. The image forming device of claim 1, wherein
the sheet feeder includes:
a sheet storage that stores the sheet,
the controller determines whether the sheet has been supplied to the sheet storage depending on whether the sheet is already stored in the sheet storage,
the defined conditions include that the controller determines that the sheet has been supplied, and
upon determining that the sheet has been supplied, the controller switches the user specified mode to the automatic discrimination mode.

13. The image forming device of claim 1, wherein
the defined conditions include that the sheet type specified by the user input does not match the discriminated sheet type, and
upon determining that the sheet type specified by the user input does not match the discriminated sheet type, the controller switches the user specified mode to the automatic discrimination mode.

14. The image forming device of claim 1, wherein
the controller estimates whether there is image quality deterioration in the image formed under the user specified mode due to a difference between the sheet type specified by the user input and the discriminated sheet type,
the defined conditions include that the controller estimates that there is the image quality deterioration, and
upon estimating that there is the image quality deterioration, the controller switches the user specified mode to the automatic discrimination mode.

15. The image forming device of claim 14, wherein
the controller estimates that there is the image quality deterioration when a processing condition corresponding to the sheet type specified by the user input do not match a processing condition corresponding to the discriminated sheet type.

16. The image forming device of claim 1, wherein
the controller can prohibit switching from the user specified mode to the automatic discrimination mode.

17. The image forming device of claim 16, wherein
the controller:
acquires a jam occurrence rate, and
prohibits switching from the user specified mode to the automatic discrimination mode when the jam occurrence rate is lower than a defined threshold.

18. The image forming device of claim 16, wherein
upon receiving an instruction to prohibit discriminating the sheet type, the controller prohibits switching from the user specified mode to the automatic discrimination mode.

19. The image forming device of claim 16, wherein
the controller:
can discriminate sheet types of a predetermined range, and
prohibits switching from the user specified mode to the automatic discrimination mode when the sheet type specified by the user input is outside the predetermined range.

20. The image forming device of claim 1, wherein
the controller:
receives an instruction with a user authority or an administrator authority, the instruction indicating whether to discriminate the sheet type,
prohibits automatically discriminating the sheet type when receiving, as the instruction, an instruction not to automatically discriminate the sheet type, and
prioritizes the instruction with the administrator authority over the instruction with the user authority.

21. The image forming device of claim 1, wherein
the controller has a plurality of methods of indicating that the one of the two setting modes is switched.

22. The image forming device of claim 1, wherein
the controller judges whether the sheet type is discriminated normally,
the defined conditions include that the controller judges that the sheet type is not discriminated normally, and
upon judging that the sheet type is not discriminated normally, the controller switches the automatic discrimination mode to the user specified mode.

23. The image forming device of claim 1, wherein
the controller judges a quality of a printing result by reading the image formed by the image forming device,
the defined conditions include that the controller judges that the quality of the printing result does not reach a predetermined level, and
upon judging that the quality of the printing result does not reach the predetermined level, the controller switches the user specified mode to the automatic discrimination mode.

24. The image forming device of claim 23, wherein
the controller estimates a basis weight of the sheet and discriminates the sheet type based on the basis weight.

25. The image forming device of claim 24, wherein
the controller estimates the basis weight of the sheet from a transmittance and a reflectance measured by irradiating the sheet with light.

* * * * *